United States Patent
Aaron et al.

(10) Patent No.: US 9,922,321 B2
(45) Date of Patent: Mar. 20, 2018

(54) PROXY FOR MULTIPLE PAYMENT MECHANISMS

(71) Applicant: Square, Inc., San Francisco, CA (US)

(72) Inventors: Paul Aaron, San Francisco, CA (US); William Henderson, Portland, OR (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/145,895

(22) Filed: Dec. 31, 2013

(65) Prior Publication Data
US 2015/0112822 A1  Apr. 23, 2015

Related U.S. Application Data

(60) Provisional application No. 61/894,327, filed on Oct. 22, 2013.

(51) Int. Cl.
| | |
|---|---|
| *G06K 5/00* | (2006.01) |
| *G06K 7/01* | (2006.01) |
| *G06Q 30/06* | (2012.01) |
| *G06Q 20/34* | (2012.01) |

(52) U.S. Cl.
CPC ................. *G06Q 20/3572* (2013.01)

(58) Field of Classification Search
CPC ......... G06Q 20/12; G06Q 20/20; G06Q 20/30
See application file for complete search history.

(56) References Cited

U.S. PATENT DOCUMENTS

| | | |
|---|---|---|
| 5,276,311 A | 1/1994 | Hennige |
| 5,530,232 A | 6/1996 | Taylor |
| 5,585,787 A | 12/1996 | Wallerstein |
| 5,590,038 A | 12/1996 | Pitroda |

(Continued)

FOREIGN PATENT DOCUMENTS

| | | |
|---|---|---|
| CA | 2 930 186 A1 | 5/2015 |
| KR | 10-2006-0103089 A | 9/2006 |

(Continued)

OTHER PUBLICATIONS

Co-Pending U.S. Appl. No. 13/830,350 by Morgan, T.B. et al., filed Mar. 14, 2013.

(Continued)

*Primary Examiner* — Talia F Crawley
(74) *Attorney, Agent, or Firm* — Maynard Cooper & Gale, P.C.

(57) ABSTRACT

Various embodiments are related to apparatuses and methods for paying for a financial transaction using a proxy object. The proxy object can be associated with multiple payment accounts, for example accounts associated with credit cards and debit cards. A consumer can present the object to a payee to make a payment, and the payee can use a device to obtain information from the object. For example, when the proxy object is a proxy card similar to a credit card, the payee can use a card reader to read information from the magnetic stripe of the proxy card. The information can be transmitted to a financial system, and the financial system can communicate with a computer system that can select a payment account associated with the proxy card to use for the payment. The financial system can process the payment using the selected payment account.

27 Claims, 11 Drawing Sheets

(56) References Cited

U.S. PATENT DOCUMENTS

| | | |
|---|---|---|
| 5,960,411 A | 9/1999 | Hartman et al. |
| 6,175,922 B1 | 1/2001 | Wang |
| 6,193,155 B1 | 2/2001 | Walker et al. |
| 6,263,352 B1 | 7/2001 | Cohen |
| 6,341,353 B1 | 1/2002 | Herman et al. |
| 6,427,911 B1* | 8/2002 | Barnes .................. G06Q 20/02 235/379 |
| 6,764,005 B2 | 7/2004 | Cooper |
| 7,085,812 B1 | 8/2006 | Sherwood |
| 7,155,411 B1 | 12/2006 | Blinn et al. |
| 7,233,843 B2 | 6/2007 | Budhraja et al. |
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,580,873 B1 | 8/2009 | Silver et al. |
| 7,603,382 B2 | 10/2009 | Halt, Jr. |
| 7,805,378 B2 | 9/2010 | Berardi et al. |
| 7,818,809 B1 | 10/2010 | Sobel et al. |
| 8,060,259 B2 | 11/2011 | Budhraja et al. |
| 8,190,514 B2 | 5/2012 | Bishop et al. |
| 8,266,551 B2 | 9/2012 | Boldyrev et al. |
| 8,280,793 B1 | 10/2012 | Kempkes et al. |
| 8,401,710 B2 | 3/2013 | Budhraja et al. |
| 8,423,459 B1 | 4/2013 | Green et al. |
| 8,459,544 B2 | 6/2013 | Casey et al. |
| 8,498,888 B1 | 7/2013 | Raff et al. |
| 8,498,900 B1 | 7/2013 | Spirin et al. |
| 8,577,731 B1 | 11/2013 | Cope et al. |
| 8,577,803 B2 | 11/2013 | Chatterjee et al. |
| 8,579,203 B1 | 11/2013 | Lambeth et al. |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,712,854 B1 | 4/2014 | Rafferty et al. |
| 8,788,418 B2 | 7/2014 | Spodak et al. |
| 8,855,312 B1 | 10/2014 | Hodgman et al. |
| 8,859,337 B2 | 10/2014 | Gaul et al. |
| 8,939,357 B1 | 1/2015 | Perry |
| 8,972,298 B2 | 3/2015 | Kunz et al. |
| 9,010,644 B1 | 4/2015 | Workley |
| 9,064,249 B1 | 6/2015 | Borovsky et al. |
| 9,092,767 B1 | 7/2015 | Andrews et al. |
| 9,092,776 B2 | 7/2015 | Dessert |
| 9,092,828 B2 | 7/2015 | Hosp |
| 9,183,480 B1 | 11/2015 | Quigley et al. |
| 2003/0061157 A1 | 3/2003 | Hirka et al. |
| 2003/0065805 A1 | 4/2003 | Barnes, Jr. |
| 2003/0115126 A1 | 6/2003 | Pitroda |
| 2004/0030601 A1 | 2/2004 | Pond et al. |
| 2004/0138999 A1 | 7/2004 | Friedman et al. |
| 2004/0204990 A1 | 10/2004 | Lee et al. |
| 2004/0215520 A1 | 10/2004 | Butler et al. |
| 2004/0219971 A1 | 11/2004 | Ciancio et al. |
| 2006/0032906 A1 | 2/2006 | Sines |
| 2006/0085333 A1 | 4/2006 | Wah |
| 2006/0131385 A1 | 6/2006 | Kim |
| 2006/0146839 A1 | 7/2006 | Hurwitz et al. |
| 2006/0206488 A1 | 9/2006 | Distasio |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0255653 A1 | 11/2007 | Tumminaro et al. |
| 2007/0255662 A1 | 11/2007 | Tumminaro |
| 2008/0037442 A1 | 2/2008 | Bill |
| 2008/0040265 A1 | 2/2008 | Rackley, III et al. |
| 2008/0052176 A1 | 2/2008 | Buchheit |
| 2008/0078831 A1 | 4/2008 | Johnson et al. |
| 2008/0133351 A1 | 6/2008 | White et al. |
| 2008/0177826 A1 | 7/2008 | Pitroda |
| 2008/0197201 A1 | 8/2008 | Manessis et al. |
| 2008/0222047 A1 | 9/2008 | Boalt |
| 2008/0262925 A1 | 10/2008 | Kim et al. |
| 2008/0270246 A1 | 10/2008 | Chen |
| 2008/0277465 A1 | 11/2008 | Pletz et al. |
| 2008/0296978 A1 | 12/2008 | Finkenzeller et al. |
| 2009/0043702 A1 | 2/2009 | Bennett |
| 2009/0063312 A1 | 3/2009 | Hurst |
| 2009/0070228 A1 | 3/2009 | Ronen |
| 2009/0099961 A1 | 4/2009 | Ogilvy |
| 2009/0106138 A1 | 4/2009 | Smith et al. |
| 2009/0112766 A1 | 4/2009 | Hammad et al. |
| 2009/0119190 A1 | 5/2009 | Realini |
| 2009/0159663 A1 | 6/2009 | Mullen et al. |
| 2009/0192904 A1 | 7/2009 | Patterson et al. |
| 2009/0266884 A1 | 10/2009 | Killian et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2009/0319638 A1 | 12/2009 | Faith et al. |
| 2010/0010906 A1 | 1/2010 | Grecia |
| 2010/0076777 A1 | 3/2010 | Paretti et al. |
| 2010/0082420 A1 | 4/2010 | Trititetti et al. |
| 2010/0102125 A1 | 4/2010 | Gatto |
| 2010/0174596 A1 | 7/2010 | Gilman et al. |
| 2010/0223145 A1 | 9/2010 | Dragt |
| 2010/0306099 A1 | 12/2010 | Hirson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0131128 A1 | 6/2011 | Vaananen |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1* | 7/2011 | Morgan .................. G06Q 20/02 235/380 |
| 2011/0218871 A1 | 9/2011 | Singh |
| 2011/0231270 A1 | 9/2011 | Dykes et al. |
| 2011/0246284 A1 | 10/2011 | Chaikin et al. |
| 2011/0251892 A1 | 10/2011 | Aracey |
| 2011/0251962 A1 | 10/2011 | Hruska |
| 2011/0258689 A1 | 10/2011 | Cohen et al. |
| 2011/0270747 A1 | 11/2011 | Xu |
| 2011/0276418 A1 | 12/2011 | Velani |
| 2011/0295750 A1* | 12/2011 | Rammal .................. G06Q 20/12 705/44 |
| 2011/0302019 A1 | 12/2011 | Proctor, Jr. et al. |
| 2011/0302080 A1 | 12/2011 | White et al. |
| 2011/0313840 A1 | 12/2011 | Mason et al. |
| 2011/0313867 A9 | 12/2011 | Silver |
| 2011/0313871 A1 | 12/2011 | Greenwood |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059718 A1 | 3/2012 | Ramer et al. |
| 2012/0059758 A1 | 3/2012 | Carlson |
| 2012/0084210 A1 | 4/2012 | Farahmand |
| 2012/0110568 A1 | 5/2012 | Abel et al. |
| 2012/0143772 A1 | 6/2012 | Abadir |
| 2012/0150611 A1 | 6/2012 | Isaacson et al. |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0209749 A1 | 8/2012 | Hammad et al. |
| 2012/0209773 A1 | 8/2012 | Ranganathan |
| 2012/0214416 A1 | 8/2012 | Kent et al. |
| 2012/0244885 A1 | 9/2012 | Hefetz |
| 2012/0254031 A1 | 10/2012 | Walker et al. |
| 2012/0271707 A1 | 10/2012 | Harrison et al. |
| 2012/0271725 A1 | 10/2012 | Cheng |
| 2012/0278727 A1 | 11/2012 | Ananthakrishnan et al. |
| 2012/0290422 A1 | 11/2012 | Bhinder |
| 2012/0290609 A1 | 11/2012 | Britt |

(56) References Cited

U.S. PATENT DOCUMENTS

| | | |
|---|---|---|
| 2012/0296679 A1 | 11/2012 | Im |
| 2012/0296726 A1 | 11/2012 | Dessert et al. |
| 2012/0310760 A1 | 12/2012 | Phillips et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0024364 A1 | 1/2013 | Shrivastava et al. |
| 2013/0024371 A1 | 1/2013 | Hariramani et al. |
| 2013/0030889 A1 | 1/2013 | Davich et al. |
| 2013/0030997 A1 | 1/2013 | Spodak et al. |
| 2013/0041824 A1 | 2/2013 | Gupta |
| 2013/0048719 A1* | 2/2013 | Bennett ............ G06Q 20/105 235/380 |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132274 A1 | 5/2013 | Henderson et al. |
| 2013/0134216 A1 | 5/2013 | Spodak et al. |
| 2013/0134962 A1 | 5/2013 | Kamel et al. |
| 2013/0138563 A1 | 5/2013 | Gilder et al. |
| 2013/0144707 A1 | 6/2013 | Issacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204777 A1 | 8/2013 | Irwin, Jr. et al. |
| 2013/0204793 A1 | 8/2013 | Kerridge et al. |
| 2013/0218697 A1 | 8/2013 | Kingston et al. |
| 2013/0218721 A1 | 8/2013 | Borhan et al. |
| 2013/0225081 A1 | 8/2013 | Doss et al. |
| 2013/0228616 A1 | 9/2013 | Bhosle et al. |
| 2013/0236109 A1 | 9/2013 | Madden et al. |
| 2013/0246203 A1 | 9/2013 | Laracey |
| 2013/0246218 A1* | 9/2013 | Gopalan ............ G06Q 30/00 705/26.8 |
| 2013/0246280 A1 | 9/2013 | Kirsch |
| 2013/0248591 A1 | 9/2013 | Look et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0317835 A1 | 11/2013 | Mathew |
| 2013/0317950 A1 | 11/2013 | Abraham et al. |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0032297 A1 | 1/2014 | Germann et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081853 A1 | 3/2014 | Sanchez et al. |
| 2014/0081854 A1 | 3/2014 | Sanchez et al. |
| 2014/0084059 A1 | 3/2014 | Sierchio et al. |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0108245 A1 | 4/2014 | Drummond et al. |
| 2014/0114775 A1 | 4/2014 | Cloin et al. |
| 2014/0114781 A1 | 4/2014 | Watanabe |
| 2014/0122345 A1 | 5/2014 | Argue et al. |
| 2014/0129357 A1 | 5/2014 | Goodwin |
| 2014/0129942 A1 | 5/2014 | Rathod |
| 2014/0136318 A1 | 5/2014 | Alberth, Jr. et al. |
| 2014/0136349 A1 | 5/2014 | Dave et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0180805 A1 | 6/2014 | Argue et al. |
| 2014/0184505 A1 | 7/2014 | Fullerton et al. |
| 2014/0201067 A1 | 7/2014 | Lai et al. |
| 2014/0207669 A1 | 7/2014 | Rosenberg |
| 2014/0214567 A1 | 7/2014 | Llach et al. |
| 2014/0214652 A1 | 7/2014 | Zheng et al. |
| 2014/0249947 A1 | 9/2014 | Hicks et al. |
| 2014/0250002 A1 | 9/2014 | Issacson et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279098 A1 | 9/2014 | Ham |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0120418 A1 | 4/2015 | Cervenka et al. |
| 2015/0127553 A1 | 5/2015 | Sundaram et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0194023 A1 | 7/2015 | Brackenridge et al. |
| 2016/0086166 A1 | 3/2016 | Pomeroy et al. |

FOREIGN PATENT DOCUMENTS

| | | |
|---|---|---|
| WO | 2015/061005 A1 | 4/2015 |
| WO | 2015/069389 A1 | 5/2015 |
| WO | 2015/100378 A1 | 7/2015 |
| WO | 2015/179316 A1 | 11/2015 |

OTHER PUBLICATIONS

Co-Pending U.S. Appl. No. 13/837,562 by Chin, H.C.A. et al., filed Mar. 15, 2013.
Co-Pending U.S. Appl. No. 14/088,113 by Maxwell, D.W. et al., filed Nov. 22, 2013.
Co-Pending U.S. Appl. No. 14/088,141 by Maxwell, D., filed Nov. 22, 2013.
Co-Pending U.S. Appl. No. 14/149,754 by Spindel, N., et al. filed Jan. 7, 2014.
Co-Pending U.S. Appl. No. 14/160,490 by Morig, D., et al., filed Jan. 21, 2014.
Co-Pending U.S. Appl. No. 14/165,256 by Aaron, P., filed Jan. 27, 2014.
Co-Pending U.S. Appl. No. 14/168,274 by Odawa, A. et al., filed Jan. 30, 2014.
Co-Pending U.S. Appl. No. 14/172,842 by Borovsky, A. et al., filed Feb. 25, 2014.
Co-Pending U.S. Appl. No. 14/182,655 by Spindel, N., filed Feb. 18, 2014.

(56) References Cited

OTHER PUBLICATIONS

Co-Pending U.S. Appl. No. 14/184,503 by Borovsky, A., filed Feb. 19, 2014.
Co-Pending U.S. Appl. No. 14/189,869 by Lamba, K. et al., filed Feb. 25, 2014.
Co-Pending U.S. Appl. No. 14/189,880 by Aaron, P. et al., filed Feb. 25, 2014.
U.S. Appl. No. 14/513,076 of Borovsky, A. et al., filed Oct. 13, 2014.
Final Office Action dated Aug. 28, 2014, U.S. Appl. No. 14/160,490 of Morig, D., et al., filed Jan. 21, 2014.
Non-Final Office Action dated Aug. 27, 2014, U.S. Appl. No. 14/165,256 of Aaron, P., filed Jan. 27, 2014.
Non-Final Office Action dated May 29, 2014, U.S. Appl. No. 13/837,562 of Chin, H.C.A. et al., filed Mar. 15, 2013.
Notice of Allowance dated Aug. 1, 2014, U.S. Appl. No. 14/172,842 of Borovsky, A. et al., filed Feb. 4, 2014.
Restriction Requirement dated Apr. 28, 2014, U.S. Appl. No. 14/165,256 of Aaron, P., filed Jan. 27, 2014.
U.S. Appl. No. 14/208,800 of Thome, J.P. et al., filed Mar. 13, 2014.
U.S. Appl. No. 14/225,338 of Aaron, P. et al., filed Mar. 25, 2014.
Non-Final Office Action dated Apr. 10, 2014, U.S. Appl. No. 14/160,490 of Morig, D., et al., filed Jan. 21, 2014.
Non-Final Office Action dated Apr. 9, 2014, U.S. Appl. No. 14/172,842 of Borovsky, A. et al., filed Feb. 4, 2014.
"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.
"Online Shopping," dated Nov. 2, 2014, Retrieved from the Internet URL: http://en.wikipedia.org/wiki/Online_shopping, on Nov. 10, 2014, pp. 1-12.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
U.S. Appl. No. 13/829,658, of Morgan, T.B., et al., filed Mar. 14, 2013.
U.S. Appl. No. 13/829,080, of Morgan, T.B., et al., filed Mar. 14, 2013.
U.S. Appl. No. 14/197,704, of Lamba, K., et al., filed Mar. 5, 2014.
U.S. Appl. No. 14/730,860, of Sasmaz, Y., et al., filed Jun. 4, 2015.
U.S. Appl. No. 14/329,638, of Aaron, P., et al., filed Jul. 11, 2014.
U.S. Appl. No. 14/329,658, of Aaron, P., et al. filed Jul. 11, 2014.
Non-Final Office Action dated Mar. 19, 2015, for U.S. Appl. No. 14/329,638, of Aaron, P., et al. filed Jul. 11, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jun. 11, 2015, for U.S. Appl. No. 14/692,655, of Borovsky, A., et al., filed Apr. 21, 2015.
Restriction Requirement dated Jun. 19, 2015, for U.S. Appl. No. 14/329,658, of Aaron, P., et al., filed Jul. 11, 2014.
U.S. Appl. No. 14/526,361 of White, M.W., et al., filed Oct. 28, 2014.
Advisory Action dated Nov. 18, 2014, U.S. Appl. No. 14/160,490 of Moring, D., et al., filed Jan. 21, 2014.
International search report and written opinion for PCT Application No. PCT/US2014/058398 dated Dec. 24, 2014.
International search report and written opinion for PCT Application No. PCT/US2014/058447 dated Jan. 15, 2015.
Final Office Action dated Jan. 26, 2015, U.S. Appl. No. 13/837,562 of Chin, H.C.A., et al., filed Mar. 15, 2013.
Notice of Allowance dated Feb. 20, 2015, U.S. Appl. No. 14/513,076 of Borovsky, A., et al., filed Oct. 13, 2014.
Final Office Action dated Mar. 17, 2015, U.S. Appl. No. 14/165,256 of Aaron, P., filed Jan. 27, 2014.
International search report and written opinion for PCT Application No. PCT/US2014/072269 dated Mar. 31, 2015.
Restriction Requirement dated Apr. 9, 2015, U.S. Appl. No. 14/225,338 of Aaron, P., et al., filed Mar. 25, 2014.
U.S. Appl. No. 14/692,655 of Borovsky, A., et al., filed Apr. 21, 2015.
Non-Final Office Action dated Apr. 27, 2015, U.S. Appl. No. 14/184,503 of Borovsky, A., et al., filed Feb. 19, 2014.
Non-Final Office Action dated May 12, 2015, U.S. Appl. No. 14/189,869 of Lamba, K., et al., filed Feb. 25, 2014.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K, et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Non-Final Office Action dated Oct. 8, 2015, for U.S. Appl. No. 14/149,754, of Spindel, N., et al., filed Jan. 7, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Non-Final Office Action dated Jul. 2, 2015, for U.S. Appl. No. 14/208,800, of Thome, J.P., et al., filed Mar. 13, 2014
Non-Final Office Action dated Jul. 10, 2015, for U.S. Appl. No. 14/526,361, of White, M.W., et al., filed Oct. 28, 2014
Restriction Requirement dated Jul. 24, 2015, for U.S. Appl. No. 14/182,655, of Spindel, N., et al., filed Feb. 18, 2014.
International Search Report and Written Opinion for PCT Application No. PCT/US2015/031423 dated Aug. 13, 2015.
Final Office Action dated Nov. 10, 2016, for U.S. Appl. No. 13/830,350, of Morgan, T.B., et al., filed Mar. 14, 2013.
Final Office Action dated Nov. 14, 2016, for U.S. Appl. No. 14/526,361, of White, M.W., et al., filed Oct. 28, 2014.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P., et al., filed Mar. 13, 2014.
Final Office Action dated Dec. 12, 2016, for U.S. Appl. No. 14/088,141, of Maxwell, D.W., et al., filed Nov. 22, 2013.
Final Office Action dated Dec. 27, 2016, for U.S. Appl. No. 14/184,503, of Borovsky, A., et al., filed Feb. 19, 2014.

(56) References Cited

OTHER PUBLICATIONS

Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
"Bluetooth Accessory Design Guidelines for Apple Products," Apple Inc., dated Sep. 18, 2013, Retrieved from the Internet URL: https://developer.apple.com/hardwaredrivers/BluetoothDesignGuidelines.pdf, pp. 1-40.
Non-Final Office Action dated Feb. 18, 2015, for U.S. Appl. No. 14/244,632, of Quigley, O.S.C., et al., filed Apr. 3, 2014.
Notice of Allowance dated Jul. 6, 2015, for U.S. Appl. No. 14/244,632, of Quigley, O.S.C., et al., filed Apr. 3, 2014.
Notice of Allowance dated Sep. 3, 2015, for U.S. Appl. No. 14/244,632, of Quigley, O.S.C., et al., filed Apr. 3, 2014.
Non-Final Office Action dated Nov. 3, 2016, for U.S. Appl. No. 14/225,342, of Lamba, K., et al., filed Mar. 25, 2014.
Final Office Action dated Mar. 10, 2017, for U.S. Appl. No. 14/225,342, of Lamba, K., et al., filed Mar. 25, 2014.
Non-Final Office Action dated Apr. 21, 2017, for U.S. Appl. No. 14/149,754, of Spindel, N., et al., filed Jan. 7, 2014.
Final Office Action dated May 19, 2017, for U.S. Appl. No. 14/168,274, of Odawa, A.W., et al., filed Jan. 30, 2014.
Advisory Action dated Jun. 9, 2017, for U.S. Appl. No. 14/225,342, of Lamba, K., et al., filed Mar. 25, 2014.
Non-Final Office Action dated Jun. 29, 2017, for U.S. Appl. No. 14/189,869, of Lamba, K., et al., filed Feb. 25, 2014.
Notice of Allowance dated Jul. 6, 2017, for U.S. Appl. No. 14/184,503, of Borovsky, A., et al., filed Feb. 19, 2014.
Extended European Search Report for European Patent Application No. 14855987.5, dated May 10, 2017.
Non-Final Office Action dated Jan. 20, 2017, for U.S. Appl. No. 14/168,274, of Odawa, A.W., et al., filed Jan. 30, 2014.
Examiner Requisition for Canadian Patent Application No. 2,930,186, dated Jan. 30, 2017.
Notice of Acceptance for Australian Patent Application No. 2014347192, dated Feb. 16, 2017.
Advisory Action dated Feb. 24, 2017, for U.S. Appl. No. 14/526,361, of White, M.W., et al., filed Oct. 28, 2014.
Corrected Notice of Allowance dated Feb. 27, 2017, for U.S. Appl. No. 14/329,658, of Aaron, P. et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P. et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al, filed Mar. 14, 2013.
Notice of Allowance dated Aug. 3, 2017, for U.S. Appl. No. 14/526,361, of White, M.W., et al., filed Oct. 28, 2014.
"Merchantindustry.com—Best Merchant Services," retrieved from internet URL: https://web.archive.org/web/20121020212419/http://www.merchantindustry.com/, on Dec. 30, 2015, pp. 1-7.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J. P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M. W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Restriction Requirement dated Feb. 29, 2016, for U.S. Appl. No. 14/088,141, of Maxwell, D. W., et al., filed Nov. 22, 2013.
Non-Final Office Action dated Mar. 14, 2016, for U.S. Appl. No. 14/692,655, of Borovsky, A., et al., filed Apr. 21, 2015.
Restriction Requirement dated Mar. 16, 2016, for U.S. Appl. No. 14/088,113, of Maxwell, D. W., et al., filed Nov. 22, 2013.
Non-Final Office Action dated Apr. 8, 2016, for U.S. Appl. No. 14/526,361, of White, M. W., et al., filed Oct. 28, 2014.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Final Office Action dated Apr. 28, 2016, for U.S. Appl. No. 14/189,880, of Aaron, P., et al., filed Feb. 25, 2014.
Non-Final Office Action dated May 3, 2016, for U.S. Appl. No. 13/830,350, of Morgan, T. B., et al., filed Mar. 14, 2013.
Non-Final Office Action dated May 9, 2016, for U.S. Appl. No. 14/225,338, of Aaron, P., et al., filed Mar. 25, 2013.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 7, 2016, for U.S. Appl. No. 14/208,800, of Thome, J.P., et al., filed Mar. 13, 2014.
Non-Final Office Action dated Jun. 8, 2016, for U.S. Appl. No. 14/088,141, of Maxwell, D.W., et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T.B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.

\* cited by examiner

PROXY FOR MULTIPLE PAYMENT MECHANISMS

CROSS-REFERENCE TO RELATED APPLICATIONS

This application claims the benefit of U.S. Provisional Patent Application No. 61/894,327, filed Oct. 22, 2013, which is incorporated by reference herein in its entirety.

BACKGROUND

Consumers today use many types of payment cards (e.g. credit cards, debit cards, prepaid gift cards) and other payment objects (e.g. a smart phone with a digital wallet) to make purchases. Consumers may carry multiple payment cards or other payment objects for a variety of reasons, however, some consumers find carrying such an array of payment options inconvenient and burdensome. For example, all these multiple payment cards add to an overstuffed wallet or purse making it difficult to find a particular payment card. Consequently, the consumer may pick the first payment card that he finds to pay for a purchase, which in retrospect may not be the best choice for the transaction. For example, the consumer, while later rummaging through the consumer's overstuffed wallet or purse, may find a prepaid gift card or a different credit card associated with a frequent flyer program, that the consumer would have preferred to use.

BRIEF DESCRIPTION OF THE DRAWINGS

Embodiments of the present invention will be described and explained through the use of the accompanying drawings in which.

DETAILED DESCRIPTION

Figure 1:
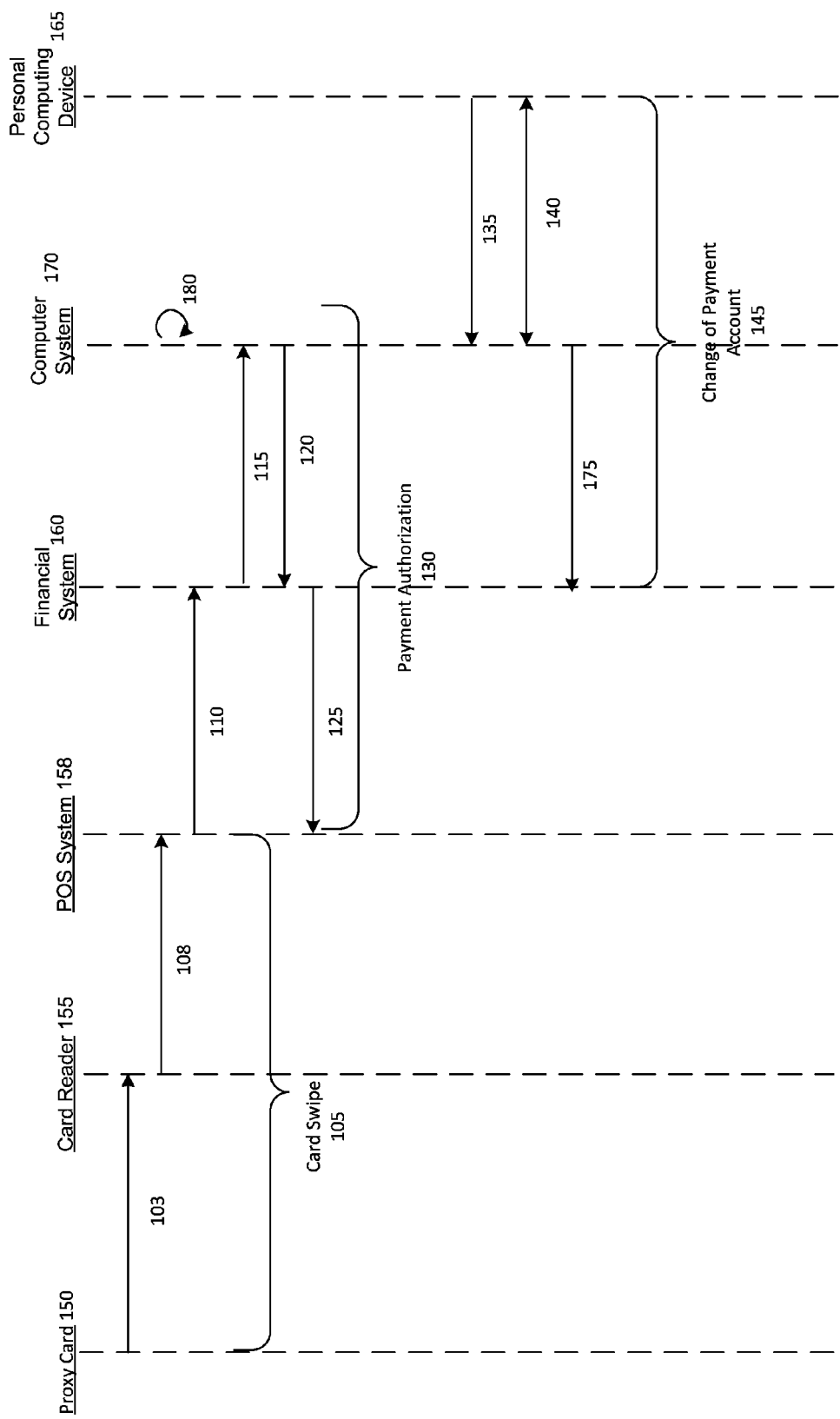
FIG. 1 is an illustration of a process for paying for a purchase using a proxy card.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

This application discloses technology related to making a payment in which a consumer can carry a payment object, for example a payment card similar to a credit card, and can associate multiple payment accounts with that payment object. The payment object is referred to herein as a proxy object, or in the case of a payment card, as a proxy card. For example, the proxy card can be associated with multiple payment accounts, such as credit card accounts, automated teller machine (ATM) card accounts and/or gift card accounts, by linking the proxy card to those accounts. The consumer can have access to all of the linked payment accounts from the proxy card, and can use the proxy card to make a payment in which funds for the payment come from any of the linked payment accounts. Hence, the consumer is relieved of the burden of having to carry multiple payment cards.

In an illustrative use case, the consumer presents a proxy card to a seller to pay for a purchase. The proxy card is swiped through a card reader, and the card reader reads proxy card information from the proxy card. The term "swipe" here refers to any manner of triggering a physical card reader to read a physical card, such as passing a card through a magnetic stripe reader, smartcard reader, optical code reader, radio frequency identification (RFID) reader, etc. After a successful swipe, the process of authorizing the transaction begins. The card reader transmits the proxy card information to the point-of-sale (POS) system to which the card reader is coupled. The term "sale", as in point-of-sale (POS), refers to any type of payment-oriented transaction, including a lease or rental for example, and is not limited to an actual purchase.

In some embodiments, the POS system sends the transaction information, which includes the proxy card information and purchase information such as the amount of the purchase and the payee, to a financial system. The financial system includes a processing service, a financial service, and a banking service. The processing service receives the transaction information from the POS system. A processing service determines the "type" of the card, with examples of "types" of cards being VISA and MasterCard branded payment cards. In this example, the magnetic stripe of the proxy card is encoded as a VISA branded payment card, but with additional meta-data. The processing service, based on the proxy card information, recognizes the "type" of the proxy card as a VISA branded payment card, and sends the transaction information to the financial service that processes VISA branded payment cards (e.g. VISA's VisaNet Payment System).

The financial service, based on the meta-data that is included in the proxy card information, determines to forward the transaction information to a computer system for further processing. In this example, the transaction information is forwarded to a computer system associated with an IP address that is contained in the meta-data. The computer system uses the proxy card information to access a database containing various data associated with the proxy card, such as the consumer's name and the associated payment accounts. The computer system selects a payment account to use for authorizing the payment based on an algorithm, or prompts the consumer to make a selection via the consumer's mobile device. The computer system sends the transaction information and the selected payment account information to the financial service that handles that "type" of account for further processing.

In this example, the "type" of the selected payment account is a MasterCard branded payment card, and the computer system sends the transaction information and the payment account information to the financial service that processes MasterCard branded payment cards (e.g. MasterCard's BankNet network). MasterCard's BankNet network determines which banking service is associated with the payment account, and forwards the transaction information and the payment account information to the banking service for further processing. A banking service manages payment accounts including funds in or available to the payment accounts. The banking service determines that the payment account has access to adequate funds for the payment, and sends an authorization for the payment to the POS system.

In some embodiments, the POS system sends the transaction information to a computer system on which a financial transaction platform is implemented. The financial transaction platform enables multiple payers to engage in financial transactions with multiple payees including processing payments made by the payers using payment cards. The processing includes causing a transfer of funds from accounts associated with the payment cards to accounts associated with the payees. The financial transaction platform has access to the database that contains the various data associated with the proxy card. The financial transaction platform determines that the transaction information includes proxy card information, and accesses the database to select a payment account to use for authorizing the payment. Alternately, the financial transaction platform can prompt the consumer to select a payment account via the consumer's mobile device.

The financial transaction platform sends the transaction information and the selected payment account information to the financial service that handles that "type" of payment account for further processing. Similar to the preceding example, the financial service forwards the transaction information to a banking service associated with the payment account, and the banking service sends an authorization for the payment to the POS system. In some embodiments, the financial transaction platform sends the authorization for the payment to the POS system. In some embodiments, the financial transaction platform sends the authorization for the payment to the financial system, which relays the authorization to the POS system.

At the point that the POS system receives the payment authorization and the consumer agrees to the financial transaction, such as by providing a signature or a personal identification number (PIN), the financial transaction is complete. If the consumer does not later change the payment account selection, the financial system will transfer funds from the payment account to an account associated with the seller to fund the payment.

In some embodiments, at a later time, such as when the consumer arrives home, the consumer can select a different payment account associated with the proxy card from which funds to make the payment are to be obtained. For example, the consumer uses his mobile device, such as a smart phone or tablet computer, to communicate with the computer system. The computer system sends information regarding the consumer's recent purchase, such as the seller, the date, and the amount of the purchase, to the consumer via the consumer's mobile device. The computer system further sends information regarding the payment accounts that are associated with the consumer's proxy card. The consumer uses the mobile device to select a second payment account from which funds for the payment are to be obtained. The computer system cancels the payment that was previously authorized, and, similar to the preceding examples, sends the transaction information and the second payment account information to the financial system for processing. The financial system transfers funds from the second payment account to the account associated with the seller to fund the payment.

FIG. 1 illustrates a process for paying for a purchase using a proxy card in accordance with various aspects of the disclosed technology. While the example of FIG. 1 involves paying for a purchase using a proxy card, the disclosed technology can be used to make any electronic payment, including payments for the purchase of goods, for rentals, for services, for financial transactions, etc. The example process illustrated in FIG. 1 has three phases. The first phase is card swipe 105. A consumer has proxy card 150, which in this example is a magnetic stripe card physically similar to a credit card. Multiple payment accounts are associated with proxy card 150 including several credit cards, an ATM card, and a prepaid gift card. The payment accounts are associated with proxy card 150, such as by being linked to proxy card 150. The links can be implemented using a database that associates proxy card 150 with the payment accounts. The consumer presents proxy card 150 to a seller to pay for a purchase. The seller executes card swipe 105, which includes step 103, in which the seller swipes proxy card 150 through card reader 155, and step 108, in which card reader 155 transmits information obtained from proxy card 150 to POS system 158, a point-of-sales (POS) system to which card reader 155 is coupled (either directly or indirectly).

POS system 158 then begins the second phase, which is payment authorization 130. Payment authorization 130 includes steps for obtaining an authorization for the payment and includes steps 110, 115, 120, 125, and 180. Payment authorization 130 starts with step 110. At step 110 POS system 158 transmits information associated with proxy card 150, referred to herein as the proxy card information, to financial system 160. In this example, the proxy card information includes identifying information for the proxy card and meta-data which is used to determine that proxy card 150 is a proxy card, among other purposes.

POS system 158 further transmits information associated with the purchase transaction, referred to herein as the transaction information, to financial system 160. The transaction information includes the amount of the transaction, information regarding the payee, and can further include individual line items from the transaction. At step 110, financial system 160 receives the proxy card information and the transaction information. At step 115, financial system 160 parses the meta-data and determines, based on the meta-data, to send a message to computer system 170. The message sent to computer system 170 at step 115 can include all or part of the proxy card information and the transaction information, among other information. The meta-data can include data such as an IP address or a phone number that indicate where the message should be sent.

Computer system 170, upon receiving the proxy card information, accesses a database access to obtain payment account information associated with proxy card 150. At step 180, computer system 170 applies an algorithm, which can be customized by the consumer, to select the payment account to use for the purchase transaction. At step 120, computer system 170 transmits the transaction information and the payment account information to financial system 160, and financial system 160 determines the results of payment authorization 130 using the selected payment account. If the payment account has access to adequate funds for the payment, and no other issue exists, financial system 160 determines that the result of payment authorization 130 is that the payment is authorized.

If some issue exists, such as the payment account does not have access to adequate funds for the payment or the payment account has a fraud alert, financial system 160 determines that the result of payment authorization 130 is that the payment is declined. Other results, such as declining the purchase transaction and instructing the seller to take possession of the proxy card, or additional information, such as an authorization number, can be transmitted to financial system 160 at step 120. At step 125, financial system 160 transmits the results of payment authorization 130 to POS system 158.

In some embodiments, instead of financial system 160 determining and sending the results of payment authorization 130, computer system 170 determines and sends the results of the payment authorization. Computer system 170 decides the payment authorization based on information such as the consumer's credit reports or scores and the history of past payments processed by computer system 170. Computer system 170 sends the payment authorization results to POS system 158, or to financial system 160, which relays the results to POS system 158.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 145. If the consumer does not utilize this phase, financial system 160 will transfer funds for the payment from the selected payment account to an account associated with the seller. However, during this phase, the consumer can select a second different payment account from which funds to for the payment are to be obtained.

The consumer uses personal computing device 165, for example a smart phone or a laptop computer, to initiate change of payment account 145 which includes steps 135, 140, and 175. At step 135, personal computing device 165 communicates with computer system 170 to initiate change of payment account 145. At step 140, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with proxy card 150 to the consumer via personal computing device 165. Computer system 170 has access to a database containing various information associated with proxy card 150, as well as associated with the consumer and the payment accounts associated with proxy card 150.

When there are multiple payment accounts associated with proxy card 150, the consumer, using personal computing device 165, can select any payment account associated with proxy card 150 from which funds for the payment are to be obtained. At step 140, personal computing device 165 transmits information indicating the selection to computer system 170. After the selection is made, at step 175 computer system 170 transmits information related to the selection, such as identifying information for the selected payment account, to financial system 160, which causes financial system 160 to obtain funds for the purchase from the selected payment account. Computer system 170 additionally prevents the funds to be obtained from the initially selected payment account, such as by canceling the payment authorization initially obtained from the initially selected payment account.

Figure 2:
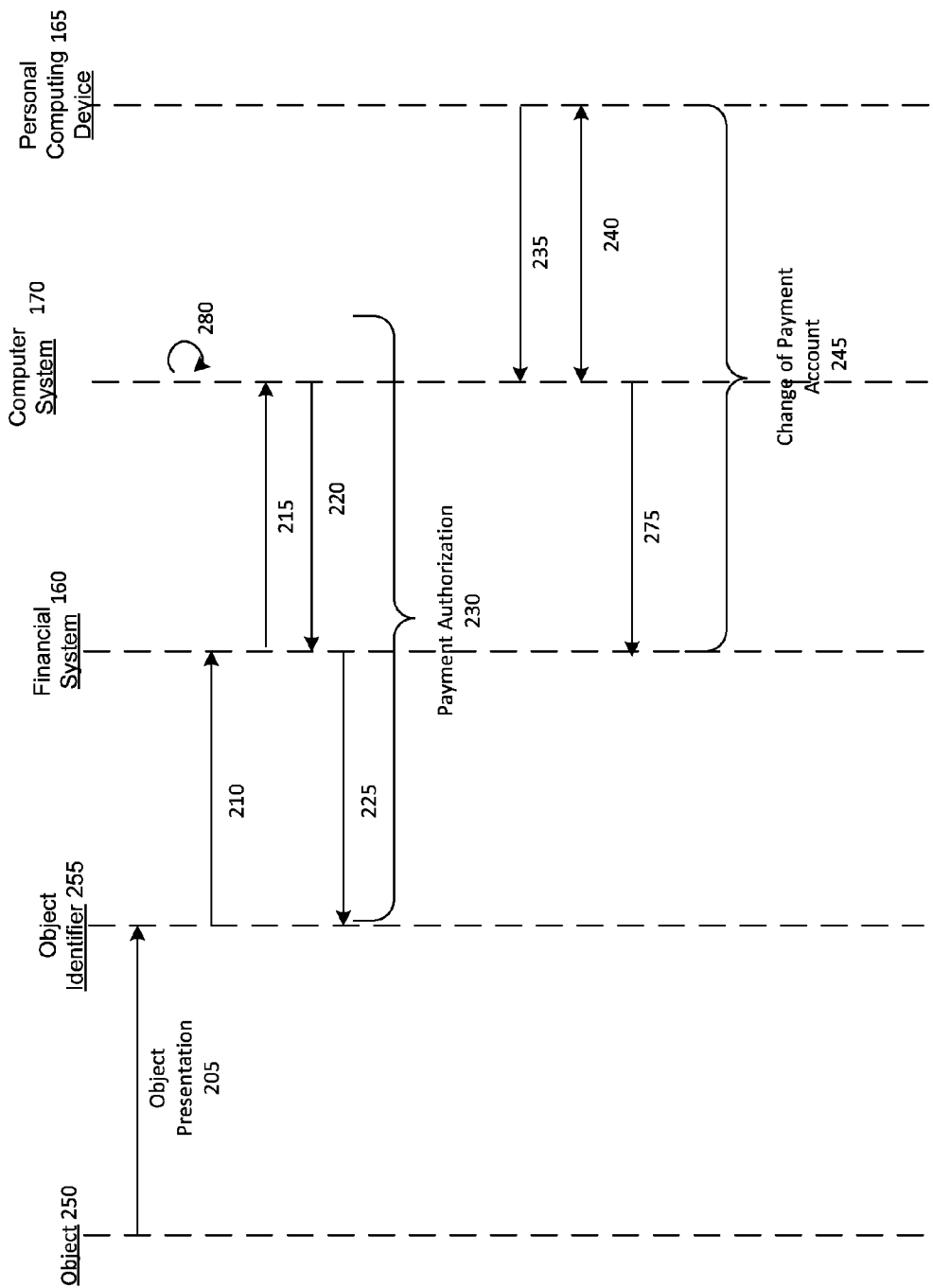
FIG. 2 is an illustration of a process for paying for a purchase using a payment object.

FIG. 2 is an illustration of a process for paying for a purchase using a payment object in accordance with various aspects of the disclosed technology. In the example illustrated in FIG. 2, the purchase process has three phases. The first phase is object presentation 205. A consumer has object 250, which is referred to herein as both a proxy object as well as a payment object. Object 250 has associated payment accounts, and can be a proxy card with associated payment accounts. The consumer presents object 250 to the seller to pay for a purchase. Because object 250 is compatible with financial system 160, object 250 can be presented to the seller in a way which enables the seller to obtain information related to object 250 sufficient to enable initiation of payment authorization 230.

As a first example, object 250 can be proxy card 150 of FIG. 1. Object presentation 205 includes presenting the proxy card so that the proxy card can be read by object identifier 255. In this example, object identifier 255 is a POS system including a card reader in which the card reader is able to obtain information associated with object 250 (i.e. the proxy card) sufficient to initiate payment authorization 230. As a second example, object 250 can be a finger. Object presentation 205 can be, for example, presenting the finger so that the fingerprint of the finger can be read by object identifier 255. In this second example, object identifier is a biometric finger scanner capable of obtaining information related to object 250 (i.e. the finger) sufficient to enable initiation of payment authorization 230.

Object identifier 255 begins the second phase, which is payment authorization 230 and includes steps 210, 215, 220, 225, and 280. Payment authorization 230 includes the steps for obtaining authorization for the payment related to the purchase transaction. Payment authorization 230 starts with step 210. At step 210, object identifier 255 obtains object information associated with object 250. For example, a POS system obtains proxy card information from the magnetic stripe of the proxy card. Step 210 continues with the transmission of the object information to financial system 160, for example the POS system transmits the proxy card information to financial system 160. Information related to the purchase transaction (i.e. the transaction information), such as the amount of the purchase, is also transmitted to financial system 160.

Object identifier 255 can be, for example, a card reader which transmits the object information and the transaction information to financial system 160. Financial system 160 receives the transmitted information, and based on this information, decides to relay the transmitted information to computer system 170 for further processing. At step 215, financial system 160 relays the transmitted information, along with other information, to computer system 170.

For example, financial system 160 receives the transmitted proxy card information, which includes meta-data, and the purchase amount. Upon receiving the proxy card information, and based on the proxy card information, financial system 160 decides to relay the transmitted information to computer system 170. At this point in time, financial system 160 does not have the information needed to complete or authorize the purchase transaction, as financial system 160 without computer system 170 is not able to determine a payment account associated with the proxy card to use for the purchase transaction.

Computer system 170, upon receiving the proxy card information, accesses a database access to obtain payment account information associated with the proxy card information. At step 280, computer system 170 applies an algorithm, which can be customized by the consumer, to select the payment account to use for the purchase transaction. The following are example algorithms which can additionally be used for step 180 of FIG. 1. 1) When there are multiple payment accounts associated with object 250 and until changed by the consumer or some other entity, the same one payment account is used for all payment made using object 250. 2) The payment account used can be different for each purchase transaction as well for each line item of a purchase transaction based on a payment account selection algorithm.

For example, a consumer can use a proxy card to purchase gas and a snack item at a gas station as part of a single purchase transaction. For this purchase transaction, the payment account selection algorithm can select a gas credit card associated with the proxy card for the gas line item, and can select a VISA credit card associated with the proxy card for the snack line item. In some embodiments, the consumer can set, modify, or change the algorithm for selecting the payment account to use for a purchase transaction. In some embodiments, the algorithm is based on inputs received from the consumer.

At step 220, computer system 170 transmits the transaction information and the payment account information to financial system 160, and financial system 160 determines the results of payment authorization 230 using the selected payment account. If the payment account has access to adequate funds for the payment, and no other issue exists, financial system 160 determines that the result of payment authorization 230 is that the payment is authorized.

If some issue exists, such as the payment account does not have access to adequate funds for the payment or the payment account has a fraud alert, financial system 160 determines that the result of payment authorization 230 is that the payment is declined. Other results, such as declining the purchase transaction and instructing the seller to take possession of the proxy card, or additional information, such as an authorization number, can be transmitted to financial system 160 at step 220. At step 225, financial system 160 transmits the results of payment authorization 230 to Object identifier 255.

In some embodiments, instead of financial system 160 determining and sending the results of payment authorization 230, computer system 170 determines and sends the results of the payment authorization. Computer system 170 decides the payment authorization based on information such as the consumer's credit reports or scores and the history of past payments processed by computer system 170. Computer system 170 can send the payment authorization results to Object identifier 255, or can send the results to financial system 160, which can relay the results to Object identifier 255.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 245. If the consumer does not utilize this phase, financial system 160 will transfer funds for the payment from the selected payment account to an account associated with the seller. However, during this phase, the consumer can select a second different payment account from which funds to make the payment are to be obtained.

The consumer uses personal computing device 165, for example a smart phone or a laptop computer, to initiate change of payment account 245 which includes steps 235, 240, and 275. At step 235, personal computing device 165 communicates with computer system 170 to initiate change of payment account 245. At step 240, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with object 250 to the consumer via personal computing device 165. Computer system 170 has access to a database containing various information associated with object 250 as well as associated with the consumer and the payment accounts associated with object 250.

When there are multiple payment accounts associated with object 250, the consumer, using personal computing device 165, can select any payment account associated with object 250 from which funds for the payment are to be obtained. At step 240, personal computing device 165 transmits information indicating the selection to computer system 170. After the selection is made, at step 275 computer system 170 transmits information related to the selection, such as payment account information, to financial system 160. This causes financial system 160 to obtain funds for the payment from the selected payment account. Computer system 170 additionally prevents the funds from being obtained from the initially selected payment account, such as by canceling the payment from the initially selected payment account. The funds can correspond to the amount of the purchase, the amount of a line item, the amount of multiple line items, or some other amount corresponding to the purchase, and can be transferred to an account associated with the seller. The funds transferred can correspond to an amount by being for the amount less a transaction fee. Further, purchase transactions can be batched, and the funds can be for an amount corresponding to the amount of the batch of purchase transactions.

Object 250 is compatible with financial system 160. In various embodiments, object 250 can be a magnetic stripe card, a smart card, a proximity card, a re-programmable magnetic stripe card, an card containing an optical code such as a quick response (QR) code or a bar code, or a biometrically identifiable object, such as a finger, a hand, an iris, or a face, among others. Object 250 can be associated with various payment objects and payment object accounts, including accounts associated with credit cards, charge cards, ATM cards, debit cards, pre-paid credit cards, pre-paid debit cards, gift cards, pre-paid gift cards, stored value cards, and fleet cards, among others. The payment accounts can be associated with object 250 by, for example, being linked to object 250. The link can be implemented, for example, using a database which links object 250 with the payment accounts. Further, object 250 can be associated with loyalty programs, wherein the loyalty programs are another type of payment account which can be used to make the purchase. In some embodiments, object 250 can be a mobile device. Examples of mobile devices include smart phones, tablets, portable media devices, wearable devices, laptops, and other portable computers.

Object identifier 255 can obtain information associated with object 250, the information being part of the object information. In embodiments where object 250 is a magnetic stripe card or a re-programmable magnetic stripe card, object identifier 255 can read the magnetic stripe. In embodiments where object 250 is a smart card, object identifier 255 can communicate with the smart card to obtain information related to object 250. In embodiments where object 250 is a proximity card, object identifier 255 can cause the proximity card to transmit information associated with the proximity card, such as a radio frequency identification (RFID), which object identifier 255 can receive. In embodiments where object 250 is a card with an optical code such as a QR code or bar code, object identifier 255 can obtain the optical code, for example, by scanning the optical code. Object identifier 255 can further transmit the object information to financial system 160.

Object identifier 255 can further include a sales system, such as POS system 158 of FIG. 1. Examples of sales systems include point-of-sale (POS) systems, cash registers, computer systems running sales applications including mobile devices running sales applications, cloud based POS systems, checkout registers, computer systems running internet based applications such as a web browser, and the like.

In embodiments where object 250 is a biometrically identifiable object, such as a finger, a hand, an iris, or a face, object identifier 255 can identify the biometrically identifiable object or can obtain information from the biometrically identifiable object and can transmit that information to a computer system that can use the information to identify the biometrically identifiable object. For example, when the biometrically identifiable object is a finger, object identifier 255 can obtain data related to the fingerprint of the finger. In some embodiments, object identifier 255 can recognize the fingerprint to identify the finger (e.g. this is the finger of Jane Doe). For example, object identifier 255 can include a biometric scanner coupled to a computer system such as a POS system, wherein the biometric scanner can scan the consumer's fingerprint, can transmit the biometric scan results to the computer system to which the biometric scanner is coupled, and the computer system can use the consumer's fingerprint to identify the finger. In other embodiments, object identifier 255 can transmit the data related to the fingerprint to a second computer system, for example, to a compute server associated with the seller, to financial system 160, to computer system 170, or to another computer system, and the second computer system can use the transmitted fingerprint data to identify the finger. The second computer system can transmit identifying information associated with the finger to object identifier 255, the identifying information being part of the object information. Object identifier 255 can further transmit the object information to financial system 160.

In embodiments where object 250 is a mobile device, object identifier 255 can obtain identifying information associated with the mobile device. In one example where object 250 is a smart phone, object identifier 255 can communicate with the smart phone via 3G to obtain identifying information related to a digital wallet associated with the smart phone, the identifying information being part of the object information. Object identifier 255 in various embodiments can communicate with the mobile device via WiFi, 3G, 4G, Near Field Communication (NFC), or Bluetooth, or can obtain an optical code such as a QR code or a bar code or any machine readable code from the mobile device, for example, by scanning an optical code displayed by the mobile device. Object identifier 255 can further transmit the object information to financial system 160.

Personal computing device 165 can be a mobile device. Examples of mobile devices include smart phones, tablets, portable media devices, wearable devices, laptops, and other portable computers. Personal computing device 165 can further be a non-portable computer, such as a desktop computer.

Object 250 can be associated with multiple payment accounts, and a loyalty program can be a payment account. A seller may be motivated to incentivize certain behaviors in customers. For example, the seller may want the consumer to return to the seller's store, or to purchase a certain item, or to return to the store during at a certain time or during a certain time window and make a purchase. To incentivize behaviors such as these, a seller can participate in or offer a loyalty program. The seller can provide loyalty points or some equivalent for each purchase made by a consumer. By coming back to the seller's store and making additional purchases, the consumer can grow the his loyalty points. The loyalty points can be redeemed for purchases made at the seller's store or another of the seller's stores or with other businesses that participate in the loyalty program.

In addition to incentivizing loyalty to a store or a brand by providing loyalty points for purchases made at the store or for brand products, a seller can use the loyalty program to incentivize other behaviors. For example, if the store has a slow period, such as a coffee shop is slow between 3 pm and 4 pm, the store owner can, in order to incentivize consumers to make purchases at the store during this slow time, offer increased loyalty points for purchases made between 3 pm and 4 pm at the store. The store owner can also offer increased redemption value for a consumer's loyalty points, or can lower the cost of products or services in terms of loyalty points, during this time window. For example, the store owner could offer to redeem 100 loyalty points and provide 150 points of value, or could reduce an item that normally costs 150 loyalty points to 100 loyalty points, for purchases made between 3 pm and 4 pm. As another example, if a business owner wants to incentivize consumers to purchase a new item the business owner is introducing, the business owner can offer increased loyalty points to consumers for purchasing this new item. The business owner can also offer increased loyalty point redemption value or reduced loyalty point costs to a consumer for purchasing this new item using loyalty program points. For example, if the new item can be normally purchased with 150 loyalty points, the business owner can offer 150 points of loyalty program value for 100 redeemed loyalty points to a consumer for purchasing this new item, or the business owner can reduce the cost of the new item to 100 loyalty points.

Figure 3A:
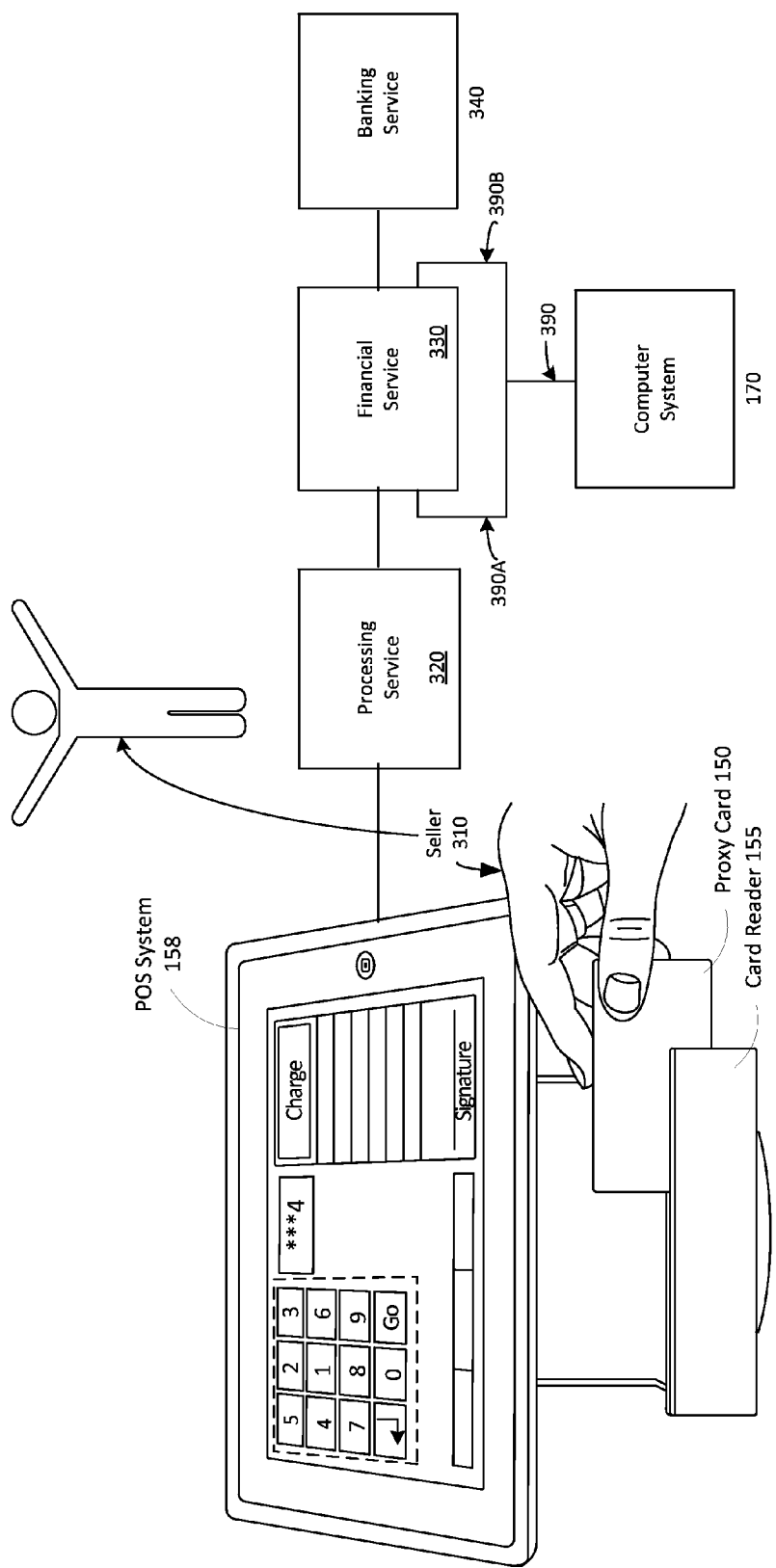
FIG. 3A is an illustration of a subset of components of or associated with a first embodiment of a financial system for processing financial transactions and associated fund transfers.
Figure 5A:
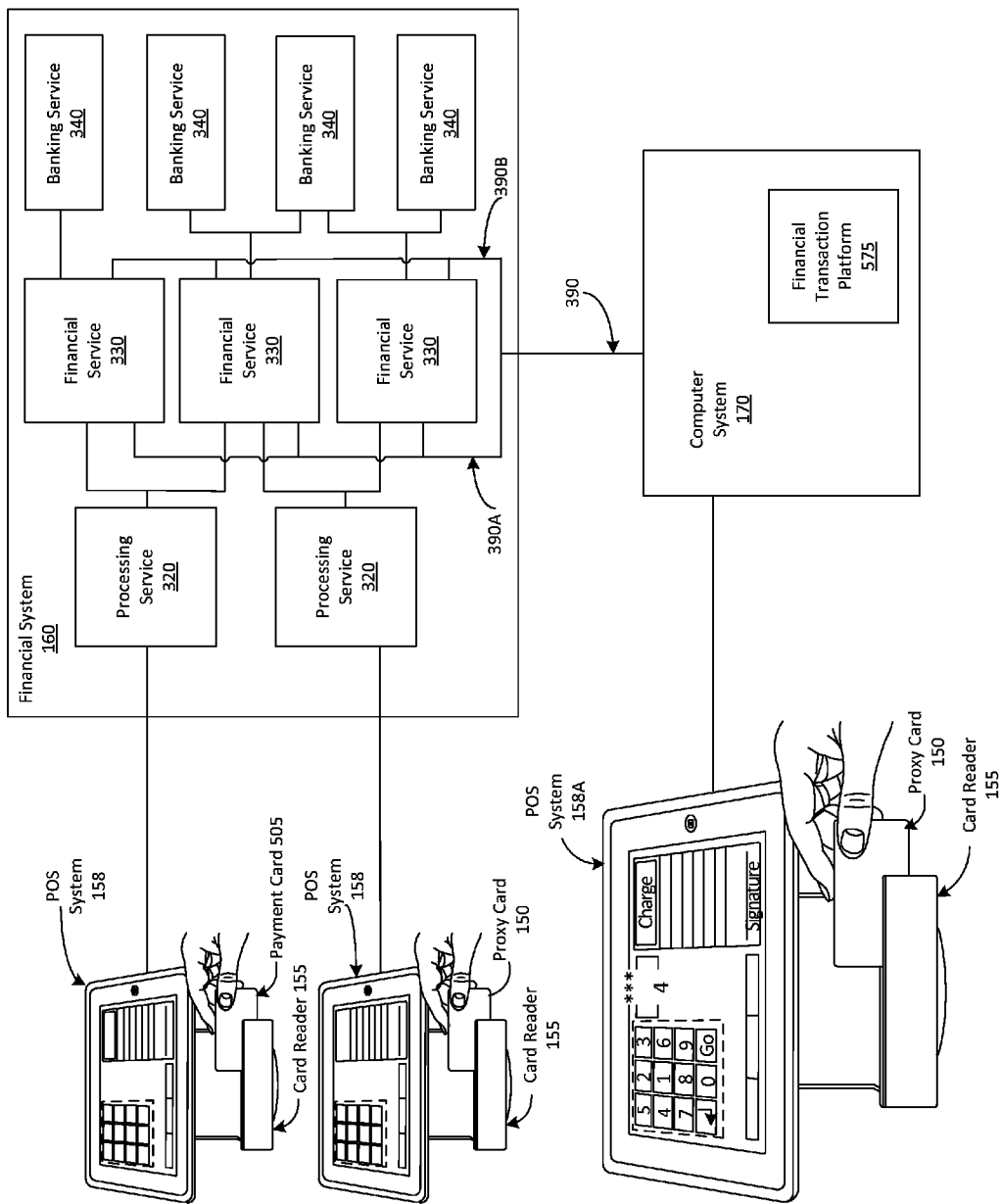
FIG. 5A is an illustration of components of or associated with a first embodiment of a financial system for processing financial transactions and associated fund transfers.
Figure 5B:
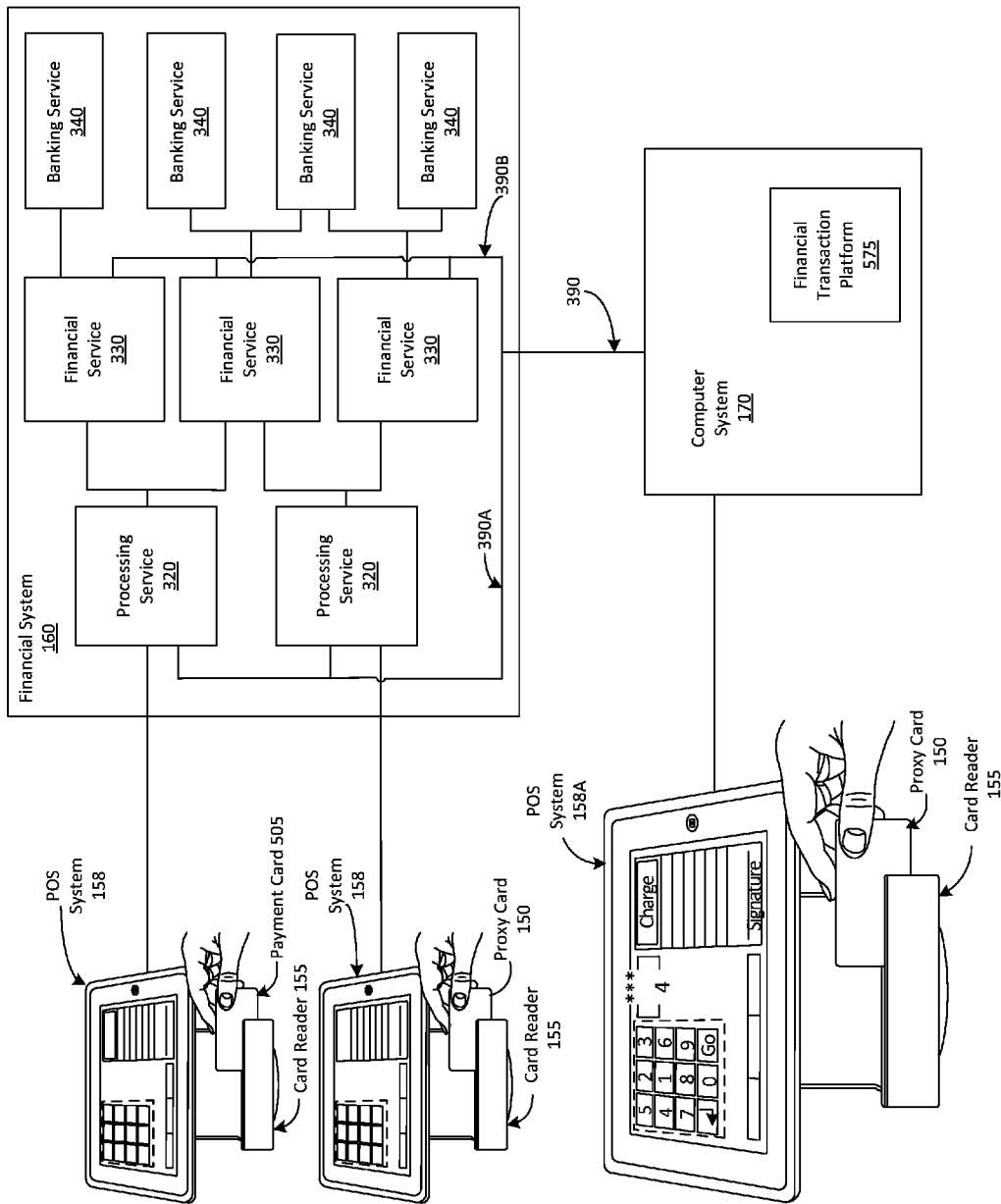
FIG. 5B is an illustration of components of or associated with a second embodiment of a financial system for processing financial transactions and associated fund transfers.

FIG. 3A is an illustration of a subset of components of or associated with a first embodiment of a financial system for processing purchase transactions and associated fund transfers. The following description of FIG. 3A will be described using the transaction illustrated in FIG. 1, and will refer to labels of that figure. FIG. 5A illustrates the first embodiment, and FIG. 3A contains the subset of the components of FIG. 5A that are relevant to explaining the transaction illustrated in FIG. 1. The following description of FIG. 3A also applies to FIG. 3B, except where differences are noted. All actions, decisions, determinations, and the like which are taken or received by computer system 170 can also be taken or received by financial transaction platform 575 when computer system 170 includes an implementation of financial transaction platform 575, as is represented in FIGS. 5A and 5B.

The transaction of this example starts when a consumer presents proxy card 150 to seller 310, the proxy card being a magnetic stripe card similar to a credit card. Seller 310 initiates card swipe 105 at step 103 by swiping proxy card 150 through card reader 155. Card reader 155 at step 108 then sends the information obtained from proxy card 150, the proxy card information, to POS system 158. Card reader 155 is coupled to POS system 158. Payment authorization 130 starts at step 110 when POS system 158 transmits the proxy card information to financial system 160. In the example of FIG. 1, proxy card 150 is encoded as a VISA branded payment card.

Figure 4A:
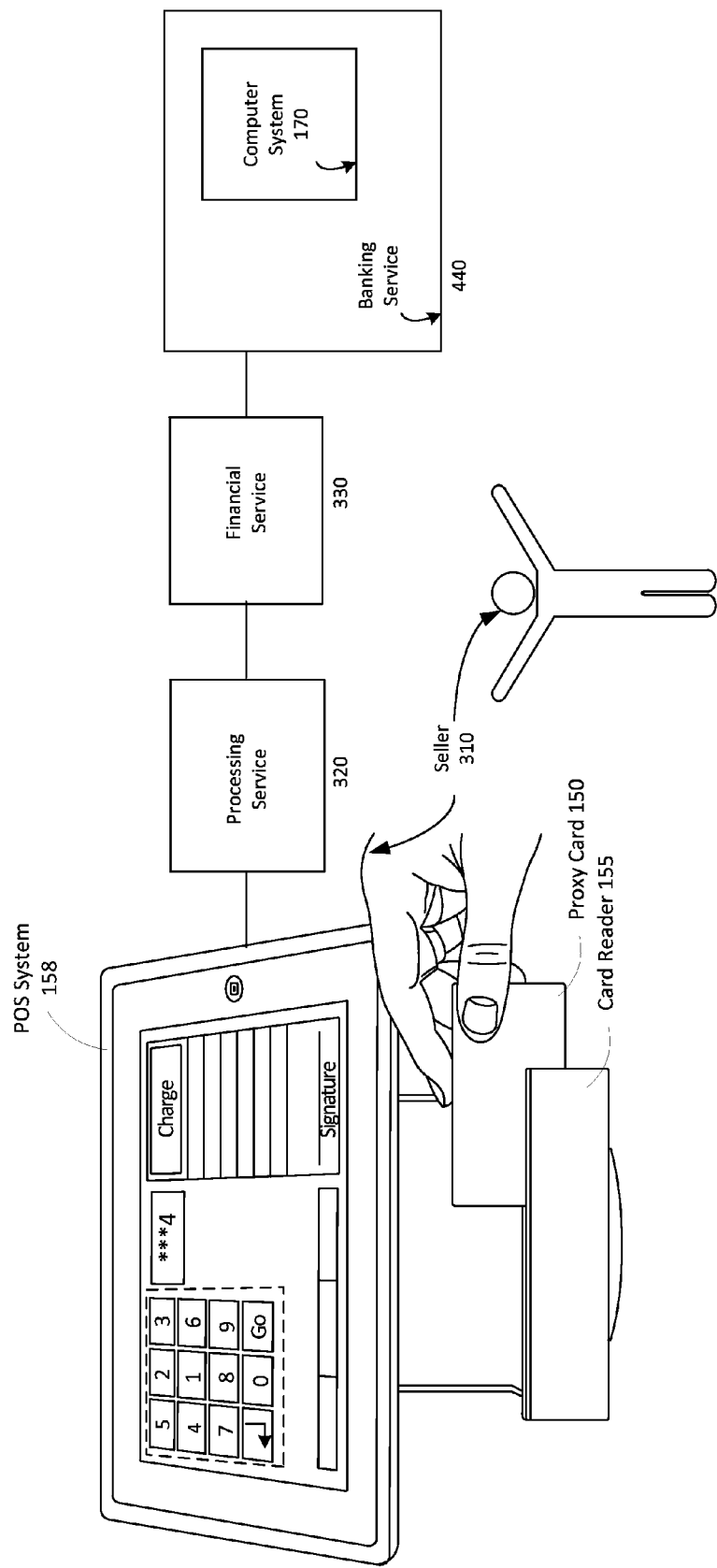
FIG. 4A is an illustration of components of or associated with a third embodiment of a financial system for processing financial transactions and associated fund transfers.
Figure 4B:
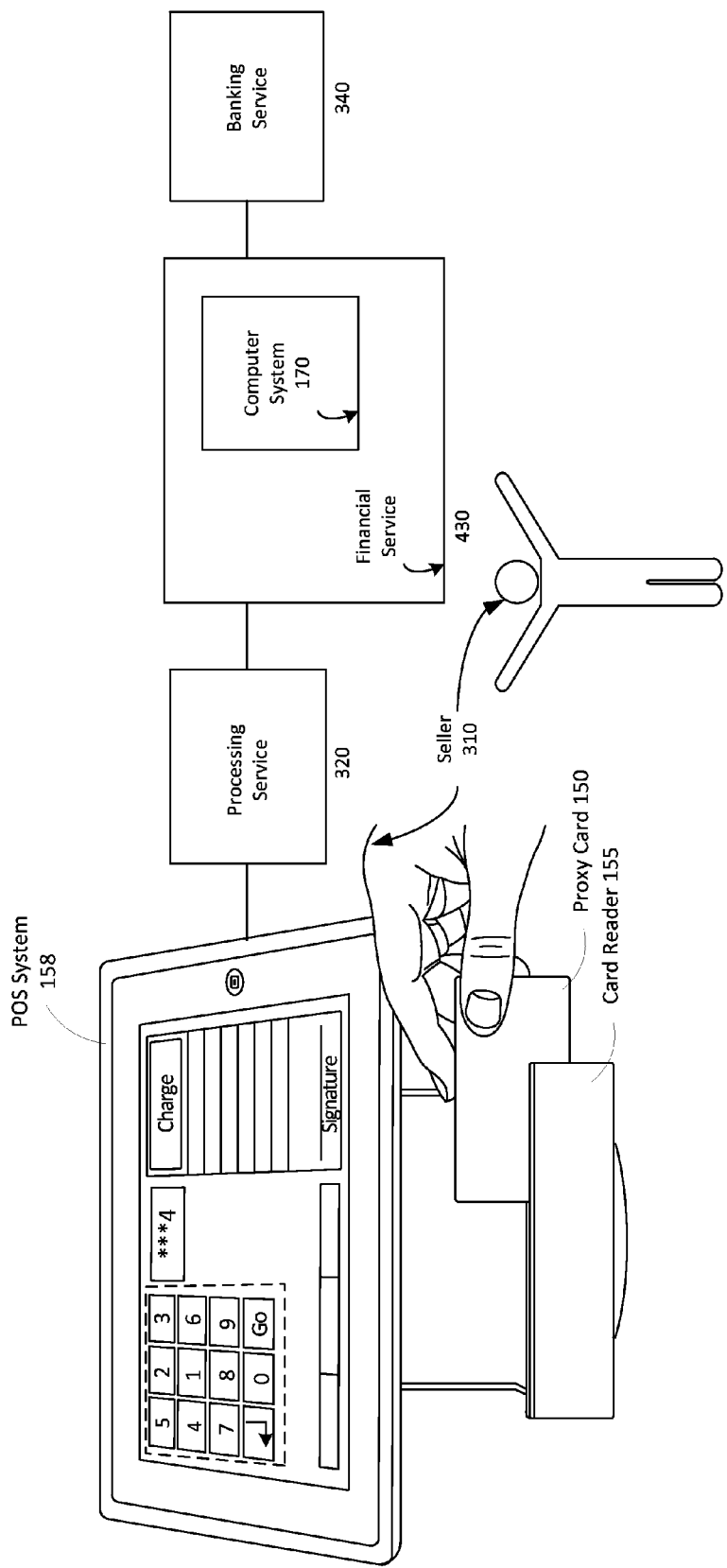
FIG. 4B is an illustration of components of or associated with a fourth embodiment of a financial system for processing financial transactions and associated fund transfers.
Figure 4C:
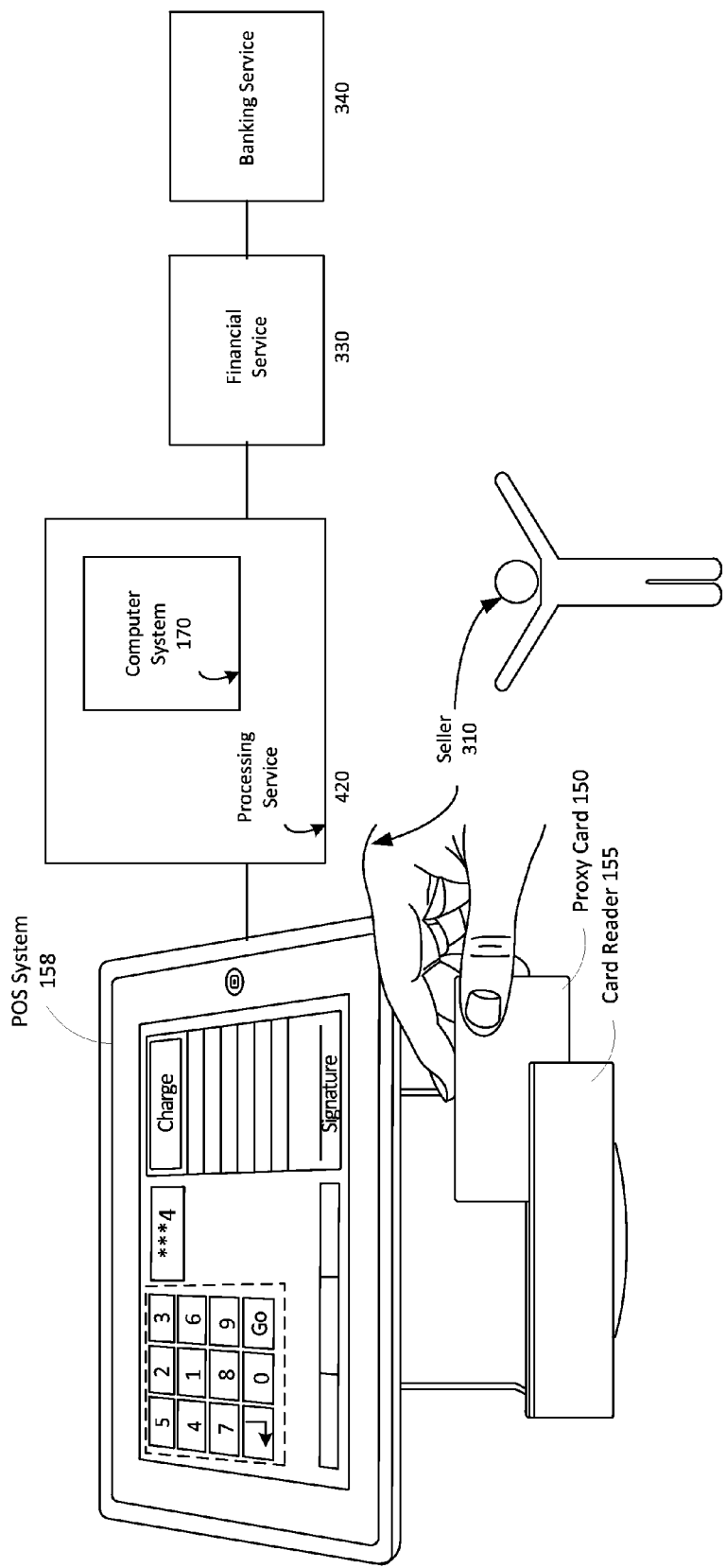
FIG. 4C is an illustration of components of or associated with a fifth embodiment of a financial system for processing financial transactions and associated fund transfers.

In the embodiment of FIG. 3A, financial system 160 includes processing service 320, financial service 330, and banking service 340. In some embodiments, financial system 160 can include computer system 170, such as in the embodiments of FIGS. 4A-4C. FIGS. 4A-4C are illustrations of components of or associated respectively with a third, fourth, and fifth embodiment of a financial system. In the embodiment of FIG. 4A, computer system 170 is under the control of banking service 440. In the embodiment of FIG. 4B, computer system 170 is under the control of financial service 430. In the embodiment of FIG. 4C, computer system 170 is under the control of processing service 420.

POS system 158 at step 110 transmits the proxy card information to financial system 160, where the proxy card information is received by processing service 320. An example of processing service 320 is Bank of America Merchant Services. Processing service 320, based on the received proxy card information, determines that proxy card 150 is encoded as a VISA branded payment card. Based on this determination, processing service 320 relays the received information to the financial service that processes VISA branded payment cards. In this example, financial service 330 is VISA's VisaNet Payment System, which processes payments made using VISA branded payment cards.

The proxy card information includes meta-data which financial service 330 uses to determine to transmit the proxy card and transaction information to computer system 170. As illustrated in FIGS. 4A-4C, in various embodiments computer system 170 can be under the control of a processing service, a financial service, or a banking service. Financial service 330, upon determining to transmit information associated with proxy card 150 to computer system 170, performs step 115 in which financial service 330 transmits information associated with proxy card 150 to computer system 170.

Connector 390 shows two connections to financial service 330 in order to facilitate explaining the example of FIG. 3A. This is not intended to represent two connections, or any specific number of connections. Connector 390 represents an information flow made via any type of communications medium, such as a network (wired or wireless). Label 390B represents a flow of information that is generally from financial system 160 to computer system 170, such as occurs at step 115. In the embodiments of FIGS. 5A and 5B, the information flow of step 115 is generally from financial service 330 to computer system 170. Label 390A represents a flow of information that is generally from computer system 170 to financial system 160, such as occurs at steps 120 and 175. In the embodiment of FIG. 5A, the information flow of steps 120 and 175 is generally from computer system 170 to financial service 330. In the embodiment of FIG. 5B, the information flow of steps 120 and 175 is generally from computer system 170 to processing service 320.

Computer system 170 at step 180 selects the payment account to use for the purchase transaction, which in this example is also a VISA branded payment card account. Computer system 170 performs step 120 which includes sending the transaction information and the payment account information to financial system 160. In the financial system embodiment of FIG. 3A, this includes sending the transaction and payment account information to financial service 330, as is represented by the branch of connector 390 that is labeled 390A. Computer system 170 sends the transaction and payment account information to financial service 330 based on a determination that the selected payment account is a VISA branded payment account, and based on a determination that financial service 330 is the financial service that processes payments made using VISA branded payment cards.

As is represented by label 390A of FIG. 5A, computer system 170 can send the transaction and payment account information to different financial services when payments from the selected payment account are processed by other financial services. Financial service 330 determines that the payment account is managed by banking service 340, and sends the transaction and payment account information to banking service 340. An example of a banking service is Chase Bank. Banking service 340 determines the result of payment authorization 130, and in step 125 sends the results of the authorization to POS system 158.

Figure 3B:
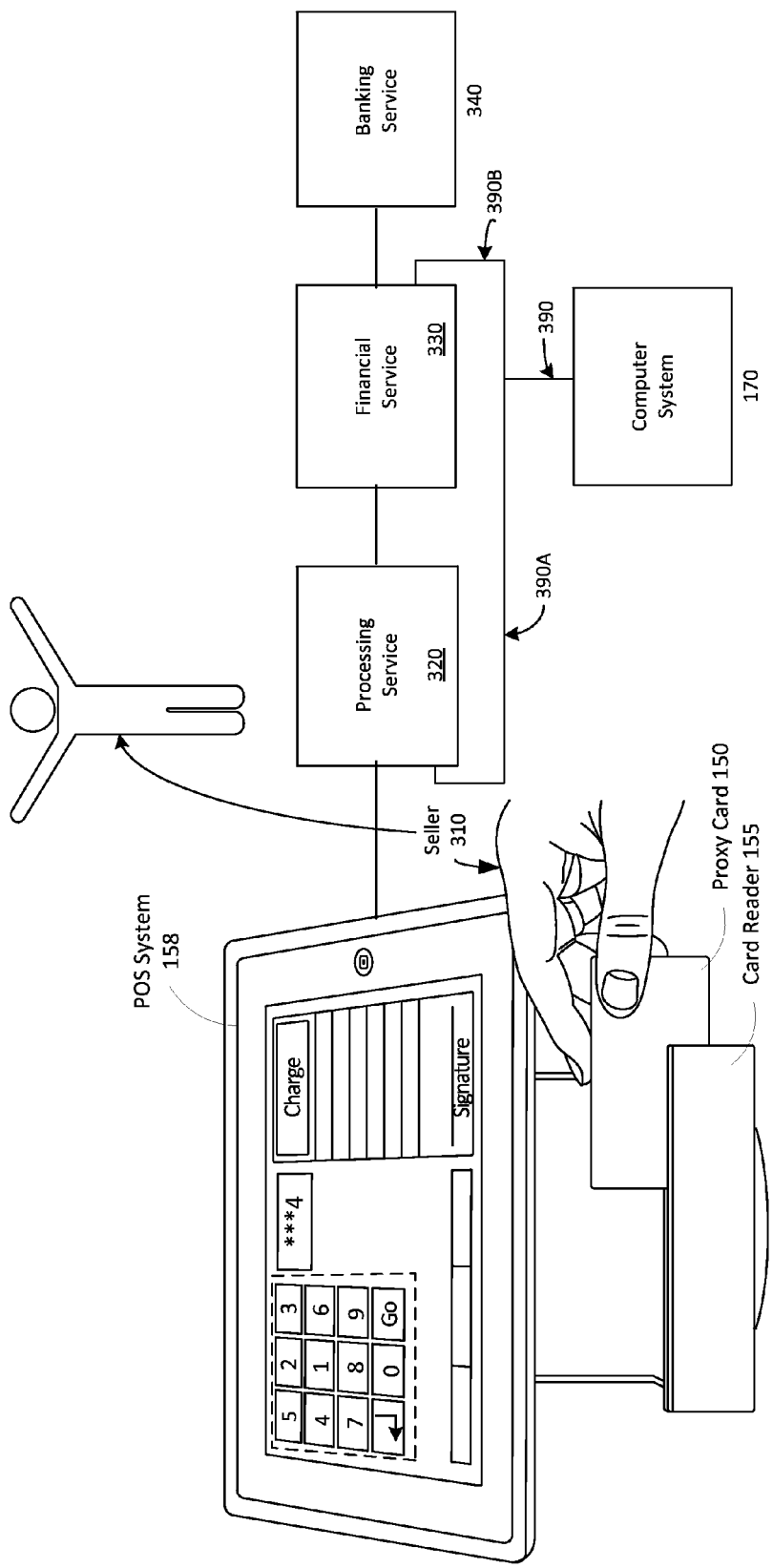
FIG. 3B is an illustration of a subset of components of or associated with a second embodiment of a financial system for processing financial transactions and associated fund transfers.

FIG. 3B is an illustration of a subset of components of or associated with a second embodiment of a financial system for processing purchase transactions and associated fund transfers. FIG. 5B illustrates the second embodiment, and FIG. 3B contains the subset of the components of FIG. 5B that are relevant to explaining the transaction illustrated in FIG. 1. In the embodiment of FIG. 3B, when computer system 170 performs step 120, computer system 170 sends the transaction information and the payment account information to processing service 320 instead of financial service 330. In this embodiment, rather than computer system 170 making the determination to send the transaction and payment account information to financial service 330 for processing, processing service 320 makes this determination. Processing service 320 sends the transaction and payment account information to financial service 330 based on a determination that the selected payment account is a VISA branded payment account, and based on a determination that financial service 330 is the financial service that processes payments made using VISA branded payment cards. In this embodiment, label 390A represents a flow of information that is generally from computer system 170 to processing service 320, such as occurs at steps 120 and 175.

Returning to the description of FIG. 3A, at this point, assuming that the purchase transaction was authorized and the consumer accepted the purchase transaction, the purchase transaction is complete. At a later time, for example when the consumer arrives at home, the consumer can optionally start phase 3, change of payment account 145. If the consumer utilizes change of payment account 145, at step 175 computer system 170 sends the second payment account information and the transaction information to financial system 160.

For the embodiment represented in FIG. 3A, and similar to the above FIG. 3A discussion related to step 120, sending the transaction and payment account information to financial system 160 includes sending the transaction and payment account information to financial service 330, as is represented by 390A of FIG. 3A. For the embodiment represented in FIG. 3B, and similar to the above FIG. 3B discussion related to step 120, sending the transaction and payment account information to financial system 160 includes sending the transaction and payment account information to processing service 320, as is represented by 390A of FIG. 3B. Processing service 320 makes a determination to send the transaction and payment account information to financial service 330.

Returning to the description of FIG. 3A, financial service 330 determines that the payment account of this example is managed by banking service 340, and sends the transaction and payment account information to banking service 340. For other payment accounts, financial service 330 may determine that a different bank manages that payment account. Financial service 330 can send the transaction and payment account information to another banking service, as is represented in FIG. 5A, which shows information flowing from multiple financial services to multiple banking services. Banking service 340 determines the result of payment authorization 130, and sends the result to computer system 170. Upon receipt of the authorization, computer system 170 ensures that funds for the payment will not be taken from the payment account initially used for the payment. This can be done, for example, by canceling the payment authorization of the previous payment account. As a result of change of payment account 145, funds for the payment will be transferred from the second payment account to the account associated with the seller, and the initial payment account will not contribute any funds for the payment.

In the financial system embodiment of FIG. 3B, causing the transfer includes computer system 170 sending the transaction and payment account information to processing service 320, as is represented by 390A of FIG. 3B. As discussed previously, processing service 320 determines to send the transaction and payment account information to financial service 330. Financial service 330 performs from this point as previously described.

FIG. 5A is an illustration of components of or associated with a first embodiment of a financial system for processing financial transactions and associated fund transfers. Computer system 170 includes financial transaction platform 575. A financial transaction platform enables multiple consumers to engage in financial transactions with multiple payees. As an example of one such financial transaction, a consumer can purchase a coffee from a merchant using payment card 505. POS system 158A can obtain payment card information from payment card 505 and can send the payment card information and the transaction information to financial transaction platform 575. Financial transaction platform 575 can process the payment made using the payment card, the processing including sending information to financial system 160 to causes a transfer of funds from the account associated with payment card 505 to an account associated with the merchant. All other components of FIG. 5A are discussed in the descriptions of FIGS. 1-4.

FIG. 5B is an illustration of components of or associated with a second embodiment of a financial system for processing financial transactions and associated fund transfers. All components of FIG. 5B are discussed in the descriptions of FIGS. 1-5A.

Figure 6:
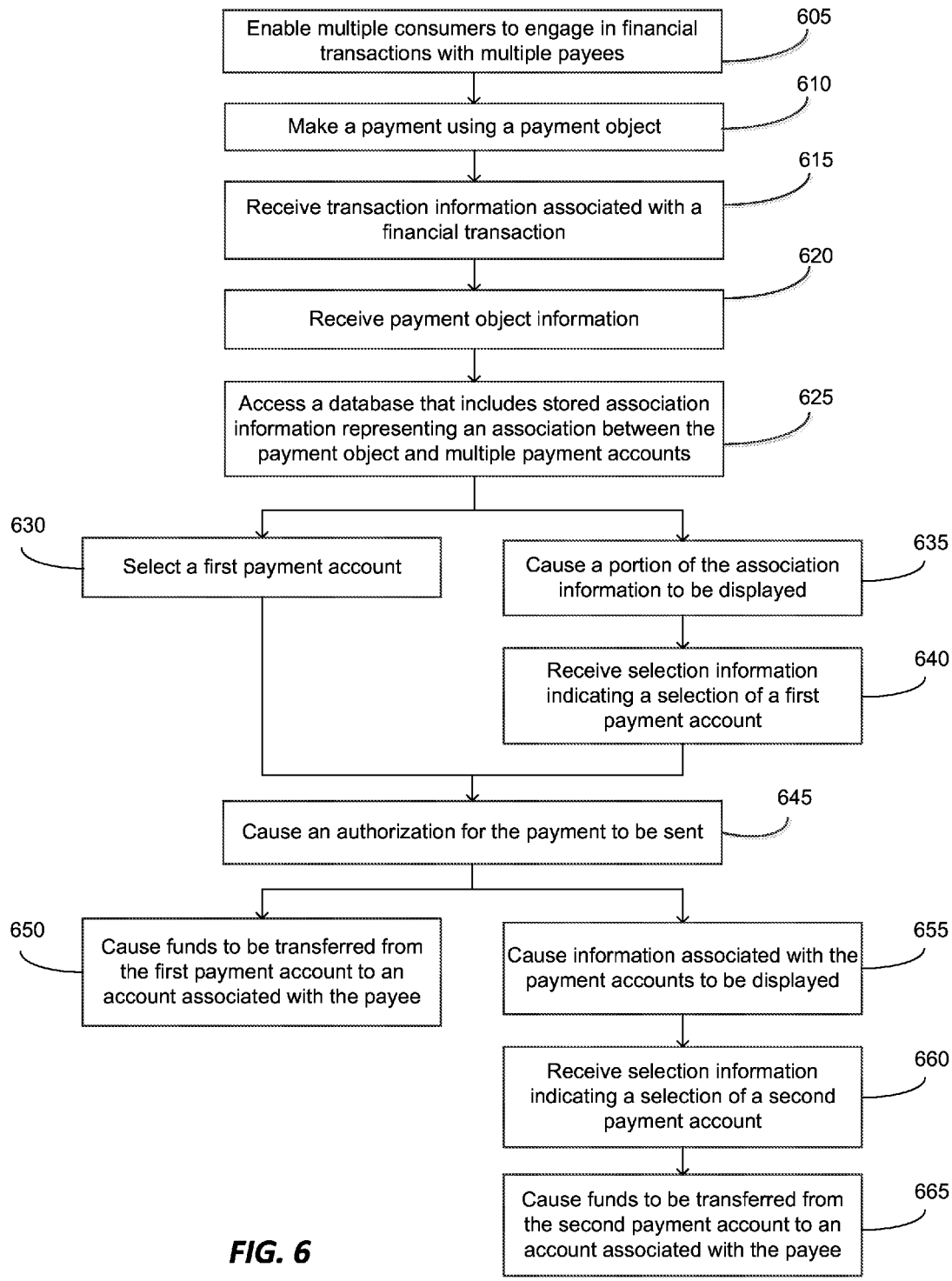
FIG. 6 is a flow chart illustrating operations of a method for processing a payment made using a payment object.

FIG. 6 is a flow chart illustrating operations of a method for processing a payment made using a payment object. Step 605 includes enabling multiple customers to engage in financial transactions with multiple payees. Step 605 can be enabled by financial transaction platform 575, as well as by computer system 170. Using the example of FIG. 5A as an example of one such financial transaction, a consumer can purchase a coffee from a merchant using payment card 505. POS system 158A can obtain payment card information from payment card 505 and can send the payment card information and the transaction information to financial transaction platform 575. Computer system 170, as well as financial transaction platform 575, can process the payment made using the payment card, the processing including sending information to financial system 160 to cause a transfer of funds from the account associated with payment card 505 to an account associated with the merchant.

Step 610 includes making a payment using a payment object. Step 610 can occur after step 605. The payment object is also referred to herein as a proxy object. The payment object can be, for example, a proxy card. A consumer can present the proxy card to make a payment associated with a financial transaction. For example, the consumer can purchase a coffee from a merchant. To pay for the coffee, the consumer can present the proxy card to the merchant, as is done in step 205 of FIG. 2. An object identifier, such as a POS system 158, can obtain proxy card information from the proxy card, as is done in step 210 of FIG. 2. The proxy card information can be sent to financial system 160, as is done in step 210 of FIG. 2. The proxy card information can alternatively be sent to computer system 170 and/or financial transaction platform 575, for example, from POS system 158A to computer system 170 and/or financial transaction platform 575. The consumer can make a payment using the proxy card by presenting the proxy card to the merchant so that the merchant's POS system can obtain proxy card information from the proxy card.

Step 615 includes receiving transaction information associated with a financial transaction. Step 615 can occur after step 610. Computer system 170 and/or financial transaction platform 575 can receive transaction information associated with a financial transaction. As per step 215, financial system 160 can send the transaction information received at step 210 to computer system 170, with computer system 170 resultantly receiving the transaction information. In some embodiments, financial transaction platform 575 is implemented on computer system 170, and financial transaction platform 575 can also receive the transaction information.

Step 620 includes receiving the payment object information. Step 620 can occur after steps 605 or 610, and before or after step 615. The payment object can be a proxy card, and computer system 170 and/or financial transaction platform 575 can receive the payment object information. As per step 215, financial system 160 can send the payment object information received at step 210 to computer system 170, with computer system 170 resultantly receiving the payment object information. In some embodiments, financial transaction platform 575 is implemented on computer system 170, and financial transaction platform 575 can also receive the payment object information.

Step 625 includes accessing a database that includes stored association information representing an association between the payment object and multiple payment accounts. Step 625 can occur after steps 610-620. The association information can be, for example, links between the payment object and the multiple payment accounts. When the payment object is a proxy card, the consumer can, for example, enter the card number of the proxy card using a web site associated with computer system 170 and/or financial transaction platform 575. The consumer can then enter the card number of a first payment card using the website. Computer system 170 and/or financial transaction platform 575 can link the first payment card with the proxy card, such as by using a database.

The consumer can similarly link additional payment cards, and the multiple payment cards can all be associated with the proxy card. The linkages in the database between the proxy card and the multiple payment accounts are association information, the association information being stored in the database. The database can have further association information, such as the name of the consumer, the consumer's address, credit report information regarding the consumer, and the like. This additional information further associates the proxy card and the multiple payment accounts, as the proxy card and the payment accounts are all associated with the consumer, and are associated with each other by this common association with the customer. The database can include additional association information.

When accessing the database, this association information can be retrieved from the database. For example, computer system 170 and/or financial transaction platform 575 can use the payment object information received during step 620 as an index into the database. One of the entries in the database can be a list of payment accounts associated with the proxy card. Computer system 170 and/or financial transaction platform 575 can retrieve this list of payment accounts, and can further retrieve payment account information from the database.

After step 625, one or more of the payment accounts associated with the proxy object can be chosen to use to obtain authorization for the payment. The payment account can be selected by computer system 170 and/or financial transaction platform 575, as happens at step 630, or can be selected by the consumer, as happens during steps 635-640.

Step 630 includes selecting a first payment account. Step 630 can be after step 625. The first payment account can be selected by computer system 170 and/or financial transaction platform 575, and can be based on an algorithm. For example, the algorithm can select the same one payment account for all payments made using the payment object. The consumer can change the payment account that is chosen. As a second example, the algorithm can select a different payment account for each purchase transaction, as well as for each line item of the purchase transaction. For example, the algorithm can select an Exxon credit card for gas purchases, and a VISA credit card for items purchased at a grocer. If the consumer purchases gas and snacks at one store, the algorithm can select the Exxon card to pay for the gas purchase and can select the VISA card to pay for the snack purchase.

Step 635 includes causing a portion of the association information to be displayed. Step 635 can be after step 625. Computer system 170 and/or financial transaction platform 575 can cause a portion of the association information to be displayed. In this scenario, for example, the customer can have just provided the proxy card to the merchant to pay for the coffee. The proxy card was swiped and the transaction is going through the authorization process. During the authorization process, a listing of the payment accounts associated with the proxy card can be displayed on the consumer's mobile device, and the consumer can use his mobile device to select the payment card to use for the payment.

For example, computer system 170 and/or financial transaction platform 575 can have obtained the listing of the payment accounts associated with the proxy card while accessing the database at step 625, the listing of the payment accounts being a portion of the association information. Computer system 170 and/or financial transaction platform 575 can send or cause to be sent this listing of payment account to the consumer's mobile device, and the consumer can use his mobile device to select the payment card to use for the payment.

Step 640 includes receiving selection information indicating a selection of a first payment account. Step 640 can occur after step 625 or 635. After the consumer uses his mobile device to select the payment account to use for the payment, the mobile device can send selection information to computer system 170 and/or financial transaction platform 575, the selection information indicating a selection of a first payment account to use for the payment.

Step 645 includes causing an authorization for the payment to be sent. Step 645 can occur after any of steps 625-640. Computer system 170 and/or financial transaction platform 575 can cause an authorization for the payment to be sent. As a first example, computer system 170 and/or financial transaction platform 575 can cause the authorization to be sent by sending the transaction information and the selected payment account information to financial system 160. The financial system can determine if the payment account has access to adequate funds to make the payment, and can authorize the payment when adequate access is available. Financial system 160 can send the authorization for the purchase to the object identifier, such as POS system 158.

As a second example, computer system 170 and/or financial transaction platform 575 can cause the authorization to be sent by sending the authorization. The authorization can be sent to the object identifier, such as POS system 158. The authorization can alternately be sent to financial system 160, which can relay the authorization to the object identifier. Computer system 170 and/or financial transaction platform 575 can decide the payment authorization based on information such as the consumer's credit reports or scores and the history of past payments processed by computer system 170 and/or financial transaction platform 575.

After step 645, the consumer can choose to change the payment account used to obtain funds for the payment.

Step 650 includes causing funds to be transferred from the first payment account to an account associated with the payee. Step 650 can occur after step 645. When the customer does not change the payment account, step 650 occurs. Computer system 170 and/or financial transaction platform 575 at step 645 sent transaction information and payment account information to financial system 160, and financial system 160 authorized the payment. The action of causing the payment authorization, unless prevented from taking effect, such as by canceling the payment, causes funds to be transferred from the first payment account to an account associated with the payee. The transaction information includes an amount corresponding to the amount to be transferred as well as information regarding the payee sufficient to allow identification of the account associated with the payee into which the funds are to be transferred. The payment account information includes information regarding the payment account sufficient to allow identification of the account to facilitate the transfer of funds from the account.

Step 655 includes causing information associated with the payment accounts to be displayed. Step 655 can occur after step 645. Computer system 170 and/or financial transaction platform 575 can cause information associated with the payment accounts to be displayed. In this scenario, for example, the customer can have completed the purchase and left the merchant's place of business with the purchased goods. Upon arriving home, the consumer can decide to change the payment account to use for the payment. The consumer can initiate communications with computer system 170 and/or financial transaction platform 575 using a computing device, such as the consumer's smartphone, tablet computer, or desktop computer. Computer system 170 and/or financial transaction platform 575 can obtain the listing of payment accounts associated with the proxy object by accessing the database, as in step 625. Computer system 170 and/or financial transaction platform 575 can send or cause to be sent the listing of payment accounts to the consumer's computing device. The computer can use the computing device to select a second payment account to use for the payment, and from which funds for the payment are to be taken.

Step 660 includes receiving selection information indicating a selection of a second payment account. Step 660 can occur after step 645 or 655. After the consumer uses his computing device to select the payment account to use for the payment, the computing device can send selection information to computer system 170 and/or financial transaction platform 575, the selection information indicating a selection of a first payment account to use for the payment.

Step 665 includes causing funds to be transferred from the second payment account to an account associated with the payee. Step 665 can occur after step 660. Computer system 170 and/or financial transaction platform 575 send the transaction information and the second payment account information to financial system 160. This is done to cause the funds for the payment to come from the second payment account rather than the first payment account. Financial system 160 can authorize the payment using the second payment account, and can send a payment authorization to computer system 170 and/or financial transaction platform 575. Computer system 170 and/or financial transaction platform 575 can also prevent funds for the payment from being obtained from the first payment account. For example, computer system 170 and/or financial transaction platform 575 can send information to financial system 160 that causes the payment and/or the payment authorization to be canceled.

Figure 7:
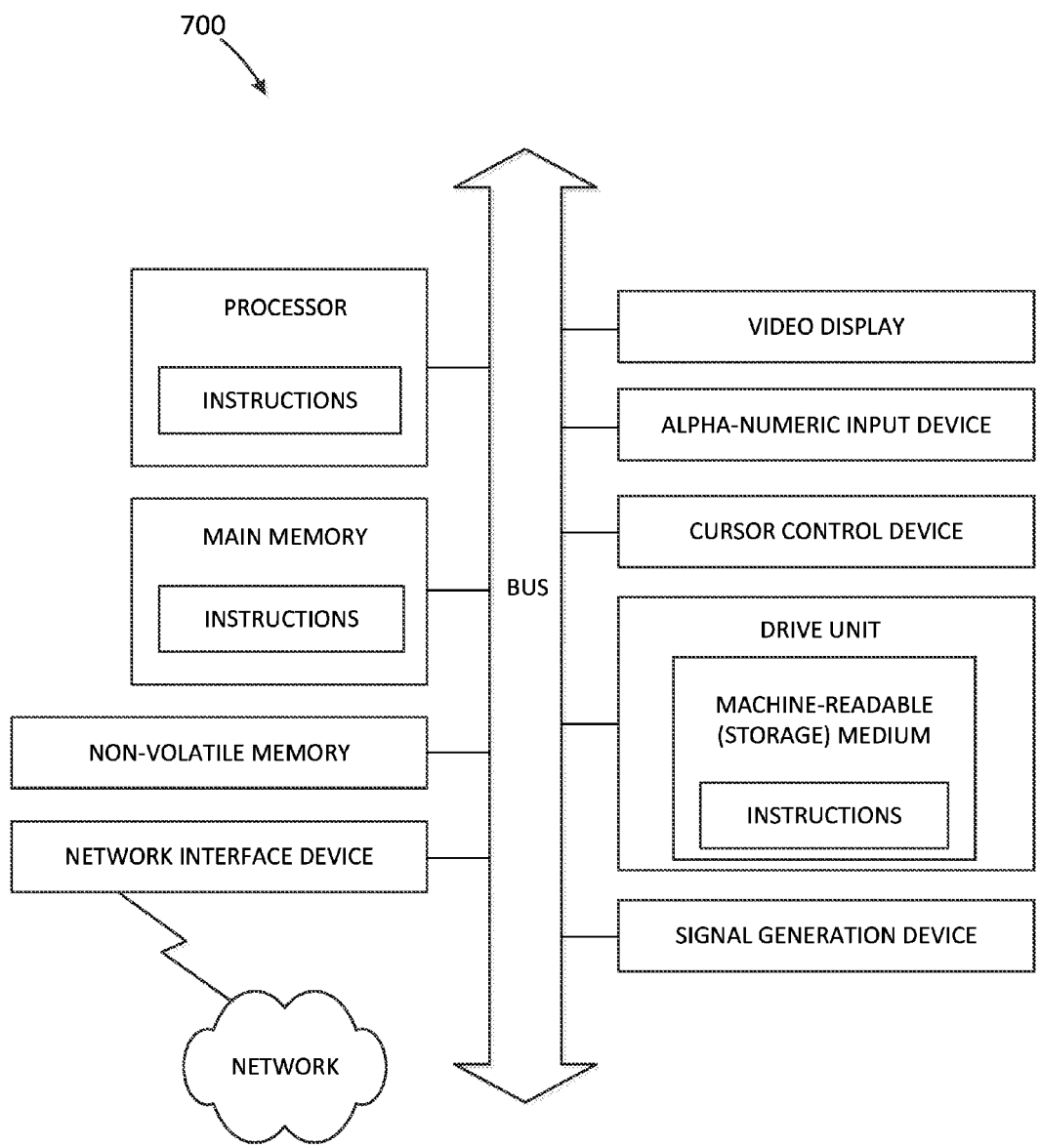
FIG. 7 is a diagrammatic representation of a computer system in which operations described herein can be executed.

FIG. 7 is a diagrammatic representation of a computer system in which operations described herein can be executed. In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components depicted in the examples of FIGS. 1-5 (and any other components described in this specification) can be implemented. The computer system 700 can be of any applicable known or convenient type. The components of the computer system 700 can be coupled together via a bus or through some other known or convenient device.

This disclosure contemplates the computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 700. The interface can include an analog modem, ISDN modem, cable modem, token ring interface, satellite transmission interface (e.g. "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 7 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smart phone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of embodiments of the present invention. One skilled in the art will appreciate that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

What is claimed is:

1. A method for processing a payment associated with a purchase transaction, the method comprising:
    receiving, from a transaction processing system and by a computer system, transaction information associated with a purchase transaction after the transaction processing system has determined to send the transaction information to the computer system based on payment object meta-data that was obtained from a proxy card by a card reader associated with a point of sale (POS) system,
    the purchase transaction involving a payment initiated by a consumer via a swipe of the proxy card through the card reader,
    the proxy card being associated with a plurality of payment accounts, each of the payment accounts associated with one of a credit card, a debit card, or a gift card,
    wherein the payment object meta-data includes an Internet Protocol (IP) address, a phone number, or other identifier associated with the computer system;
    receiving, from the transaction processing system and by the computer system, proxy card information obtained from the proxy card by the card reader,
    the proxy card information associated with a plurality of payment accounts;
    accessing, by the computer system and based on the proxy card information, a database to obtain payment account information;
    selecting, by the computer system, a first payment account based on the payment account information;
    sending, by the computer system for delivery to the POS system, an authorization for the payment to complete the purchase transaction and to prompt the POS system to generate, for delivery to the consumer, a purchase receipt for the purchase transaction, the authorization for the payment being sent prior to obtaining an approval authorization for funds for the payment from a financial business entity that manages the first payment account including managing funds in or available to the first payment account;
    sending a first process signal, by the computer system, to a first business entity computer, to initiate a first process to cause funds for the payment to be transferred from the first payment account to an account associated with the merchant;
    receiving a payment interrupt signal, by the computer system, from a personal computing device associated with the consumer, and after the sending of the authorization for the payment, wherein the payment interrupt signal indicates a selection by the consumer of a second payment account from which funds for the purchase transaction are to be obtained, the second payment account being managed by a second financial business entity;
    based on the payment interrupt signal, sending a first process interrupt signal, by the computer system, to the first business entity computer, to interrupt the first process and to prevent the funds for the payment to be transferred from the first payment account; and
    sending a second process signal, by the computer system, to a second business entity computer, to cause the funds for the payment to be transferred from the second financial business entity, based on the second payment account, to the account associated with the merchant.

2. The method of claim 1, wherein the payment interrupt signal was sent by the personal computing device based on a selection made by the consumer using the personal computing device, the method further comprising:
    causing, prior to receiving the payment interrupt signal, information associated with the payment accounts to be displayed on the personal computing device associated with the consumer to facilitate the selection made by the consumer.

3. The method of claim 1, wherein the selecting the first payment account is based on a prioritization of the payment accounts previously made by the consumer.

4. A method comprising:
receiving, by a computer system and from a transaction processing system, transaction information associated with a purchase transaction after the transaction processing system has determined to send the transaction information to the computer system based on meta data that enables identification of the computer system and that was obtained from a payment object by a card reader coupled to a point of sale (POS) system,
the transaction information including payment object information and transaction information associated with the purchase transaction,
the purchase transaction involving a payment made by a consumer using the payment object;
accessing, by the computer system, a database that includes stored association information representing an association between the payment object and a plurality of payment accounts of the consumer;
selecting, by the computer system, a first payment account associated with the payment object information based on the association information, for use in processing the payment;
accessing, by the computer system, the database to obtain credit trustworthiness data;
determining, by the computer system, to send an authorization for the payment based on the credit trustworthiness data;
sending, by the computer system and for delivery to the POS system, the authorization for the payment to complete the purchase transaction and to prompt the POS system to generate a purchase receipt for the purchase transaction, the authorization for the payment being sent prior to obtaining an approval authorization for funds for the payment from a financial business entity that manages the first payment account including managing funds in or available to the first payment account; and
sending a message, by the computer system, to cause the funds for the payment to be obtained from the financial business entity based on the first payment account.

5. The method of claim 4, wherein the payment is to a payee,
and wherein the sending of the message causes the funds for the payment to be transferred from the first payment account to an account associated with the payee in association with the payment.

6. The method of claim 4, wherein the payment is to a payee, further comprising:
receiving a payment interrupt signal, from a personal computing device associated with the consumer and after sending the authorization for the payment, that indicates a selection of a second payment account associated with the object information;
based on the payment interrupt signal, sending a process interrupt signal, by the computer system, to prevent the funds for the payment to be obtained based on the first payment account; and
sending a second message to cause the funds for the payment to be transferred from the second payment account to an account associated with the payee.

7. The method of claim 6, wherein the payment interrupt signal was sent by the personal computing device based on a selection made by the consumer using the personal computing device, the method further comprising:
causing, prior to receiving the payment interrupt signal, information associated with the payment accounts to be displayed on the personal computing device associated with the consumer to facilitate the selection made by the consumer.

8. The method of claim 4, wherein the payment object is any one of a magnetic stripe card, a smart card, a proximity card, or an optical code.

9. The method of claim 4, wherein each of the payment accounts is an account associated with any one of a credit card, a charge card, an automated teller machine (ATM) card, a debit card, a pre-paid gift card, or a fleet card.

10. The method of claim 4, wherein at least one of the payment accounts is a loyalty program.

11. A method comprising:
receiving, by a computer system and from a transaction processing system, transaction information after the transaction processing system has determined to send the transaction information to the computer system based on payment object meta-data,
the transaction information including object information and transaction information associated with a purchase transaction involving a consumer,
the purchase transaction involving a payment made by the consumer via a point of sale (POS) system by use of a payment object of the consumer,
the object information, which includes the payment object meta-data, having been derived from the payment object by the transaction processing system,
wherein the payment object meta-data includes an Internet Protocol (IP) address, a phone number, or other identifier associated with the computer system;
accessing, by the computer system, a database that includes stored association information representing an association between the payment object and a plurality of payment accounts of the consumer;
causing, by the computer system, a portion of the association information to be displayed on a mobile device associated with the consumer to facilitate a selection of a first payment account;
receiving, by the computer system and from the mobile device, selection information indicating the selection of the first payment account;
sending, by the computer system, for delivery to the POS system, an authorization for the payment to complete the purchase transaction and to prompt the POS system to generate a purchase receipt for the purchase transaction, the authorization for the payment being sent prior to obtaining an approval authorization for funds for the payment from a financial business entity that manages the first payment account including managing funds in or available to the first payment account; and
sending a message, by the computer system, to cause the funds for the payment to be obtained from the financial business entity based on the first payment account.

12. The method of claim 11, wherein the payment is to a payee,
and wherein the sending of the message causes the funds for the payment to be transferred from the first payment account to an account associated with the payee.

13. The method of claim 12, wherein the funds for the payment are to pay a portion of the payment.

14. The method of claim 11, wherein the payment is to a payee, further comprising:
receiving a payment interrupt signal, from a personal computing device associated with the consumer and after sending the authorization for the payment, that indicates a selection of a second payment account associated with the object information;

based on the payment interrupt signal, sending a process interrupt signal, by the computer system, to prevent the funds for the payment to be obtained based on the first payment account; and sending a second message to cause the funds for the payment to be transferred from the second payment account to an account associated with the payee.

15. The method of claim 14, further comprising:
causing, prior to receiving the payment interrupt signal, information associated with the payment accounts to be displayed on the personal computing device associated with the consumer to facilitate the selection of the second payment account.

16. The method of claim 14, wherein the mobile device and the personal computing device are a same single device.

17. A method comprising:
enabling, by a financial transaction platform implemented on a computer system, a plurality of consumers to engage in purchase transactions with a plurality of payees,
the purchase transactions including payments made by the consumers using payment cards,
the financial transaction platform processing the payments, the processing including causing a transfer of funds from accounts associated with the payment cards to accounts associated with the payees;
receiving, by the financial transaction platform and from a transaction processing system, transaction information after the transaction processing system has determined to send the transaction information to the financial transaction platform based on payment object meta-data,
the transaction information including object information and transaction information associated with a purchase transaction involving a consumer,
the purchase transaction involving a payment made by the consumer via a point of sale (POS) system by use of a payment object of the consumer,
the object information, which includes the payment object meta-data, derived from the payment object by the transaction processing system;
accessing, by the financial transaction platform, a database that includes stored association information representing an association between the payment object and a plurality of payment accounts of the consumer;
causing, by the financial transaction platform, a portion of the association information to be displayed on a computing device to facilitate a selection of a payment account;
receiving, by the financial transaction platform and from the computing device, selection information indicating the selection of the payment account;
sending, by the financial transaction platform, for delivery to the POS system, an authorization for the payment to complete the purchase transaction and to prompt the POS system to generate a purchase receipt for the purchase transaction, the authorization for the payment being sent prior to obtaining an approval authorization for funds for the payment from a financial business entity that manages the payment account including managing funds in or available to the payment account; and
sending a message, by the financial transaction platform, to cause the funds for the payment to be obtained from the financial business entity based on the first payment account.

18. The method of claim 17, wherein the computing device is a mobile device associated with the consumer.

19. The method of claim 17, wherein the computing device is the POS system.

20. The method of claim 17, wherein the payment is to a payee,
and wherein the sending of the message causes the funds for the payment to be transferred from the payment account to an account associated with the payee.

21. The method of claim 17, wherein the payment is to a payee, further comprising:
receiving a payment interrupt signal, from a personal computing device associated with the consumer and after sending the authorization for the payment, that indicates a selection of a second payment account associated with the object information;
based on the payment interrupt signal, sending a process interrupt to prevent the funds for the payment to be obtained based on the first payment account; and
causing funds to be transferred from the second payment account to an account associated with the payee in association with the payment.

22. The method of claim 21, further comprising:
causing, prior to receiving the payment interrupt signal, information associated with the payment accounts to be displayed on the personal computing device associated with the consumer to facilitate the selection of the second payment account.

23. A computer system comprising:
a communication device through which to communicate with remote devices;
a processor; and
a memory coupled to the processor, the memory storing instructions which when executed by the processor cause the computer system to perform operations including:
receiving, from a transaction processing system, transaction information after the transaction processing system has determined to send the transaction information to the computer system based on payment object meta-data,
the transaction information including object information and transaction information associated with a purchase transaction involving a consumer,
the purchase transaction involving a payment made by the consumer via a point of sale (POS) system by use of a payment object of the consumer,
the object information, which includes the payment object meta-data, having been derived from the payment object by the transaction processing system,
wherein the payment object meta-data includes an Internet Protocol (IP) address, a phone number, or other identifier associated with the computer system;
accessing a database that includes stored association information representing an association between the payment object and a plurality of payment accounts of the consumer;
causing a portion of the association information to be displayed on a computing device to facilitate a selection of a payment account;
receiving, from the computing device and via the communication device, selection information indicating the selection of the payment account;
sending, for delivery to the POS system, an authorization for the payment to complete the purchase transaction and to prompt the POS system to generate a purchase receipt for the purchase transaction, the authorization for the payment being sent prior to obtaining an approval authorization for funds for the payment from a financial business entity that manages the payment account including managing funds in or available to the payment account; and sending a message to cause the funds for the payment to be obtained from the financial business entity based on the payment account.

24. The computer system of claim 23, wherein the computing device is a mobile device associated with the consumer.

25. The computer system of claim 23, wherein the computing device is the POS system.

26. The method of claim 1, wherein the first business entity computer and the second business entity computer are one of a) a same computer, b) a first computer of a first business entity and a second computer of a second business entity, or c) computers of a particular business entity.

27. The method of claim 1, wherein the first business entity computer and the second business entity computer are both financial system computers that facilitate payment processing for a financial system.

* * * * *